United States Patent
Yamamoto et al.

(10) Patent No.: US 9,251,577 B2
(45) Date of Patent: Feb. 2, 2016

(54) INFORMATION PROVIDING METHOD AND INFORMATION PROVIDING DEVICE

(75) Inventors: Hirotsugu Yamamoto, Tokushima (JP); Shiro Suyama, Tokushima (JP)

(73) Assignee: The University of Tokushima, Tokushima-shi (JP)

( * ) Notice: Subject to any disclaimer, the term of this patent is extended or adjusted under 35 U.S.C. 154(b) by 254 days.

(21) Appl. No.: 14/002,553

(22) PCT Filed: Mar. 2, 2012

(86) PCT No.: PCT/JP2012/001438
§ 371 (c)(1),
(2), (4) Date: Nov. 8, 2013

(87) PCT Pub. No.: WO2012/120853
PCT Pub. Date: Sep. 13, 2012

(65) Prior Publication Data
US 2014/0085336 A1 Mar. 27, 2014

(30) Foreign Application Priority Data
Mar. 4, 2011 (JP) .................................. 2011-047967

(51) Int. Cl.
G06T 5/50 (2006.01)
G09G 5/00 (2006.01)
H04N 13/04 (2006.01)

(52) U.S. Cl.
CPC .. *G06T 5/50* (2013.01); *G09G 5/00* (2013.01); *G09G 2358/00* (2013.01); *H04N 13/0438* (2013.01); *H04N 2013/0463* (2013.01)

(58) Field of Classification Search
CPC ........................................................ G06T 5/50
See application file for complete search history.

(56) References Cited

U.S. PATENT DOCUMENTS

| 6,687,399 | B1 * | 2/2004 | Chuang ............... H04N 13/0438 |
| | | | 345/419 |
| 2003/0026449 | A1 * | 2/2003 | Yerazunis et al. ............ 382/100 |
| 2009/0080789 | A1 * | 3/2009 | Shoji ............................ 382/254 |

* cited by examiner

*Primary Examiner* — Joni Richer
*Assistant Examiner* — Grace Q Li
(74) *Attorney, Agent, or Firm* — Weaver Austin Villeneuve & Sampson LLP

(57) ABSTRACT

The present invention provides a method for providing information and an apparatus for providing information with which information can be secretly displayed, and further, a display technique with a lot of sense of fun can attract keen interest from people around a display such as digital signage. A method for providing information using an apparatus for providing information that displays information using a light array includes: switching and displaying an information array and a concealment array in a display cycle in which a person cannot sense an information display array of the information array using the apparatus for providing information. The information array includes the information display array concerning information to be provided, and the concealment array is generated so that the information display array becomes invisible when the concealment array overlaps with the information array. The information to be transmitted can be secretly included in a normally displayed array (such as an image or a panel) for display. Since appropriately and intermittently blocking light entering a person's eye is only required, the person can acquire the information to be transmitted without a special instrument.

13 Claims, 17 Drawing Sheets

F I G. 1
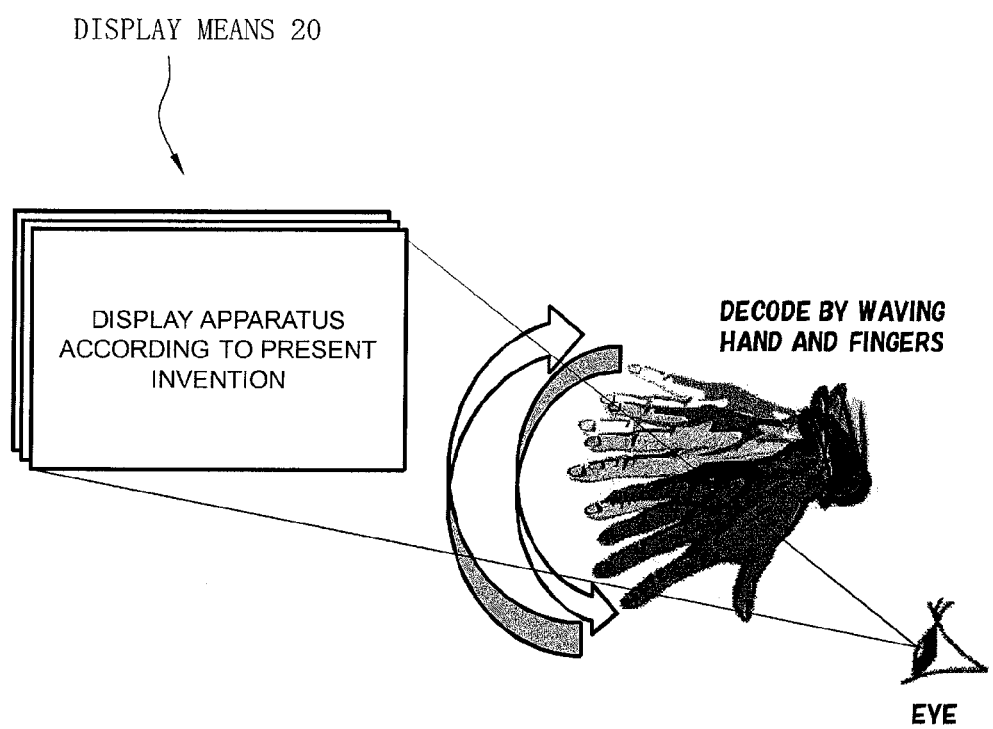

FIG. 5
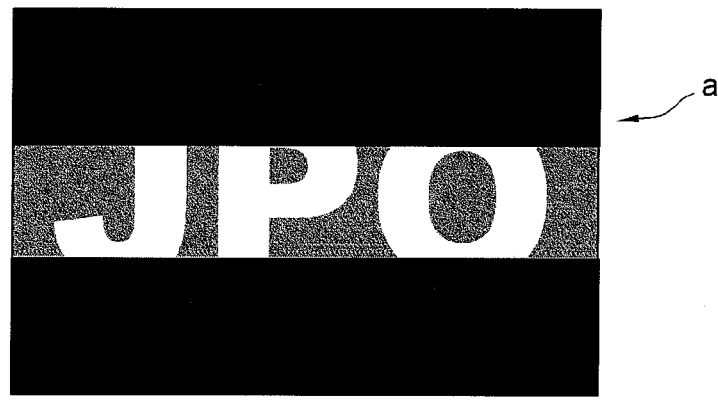
TIMING 1
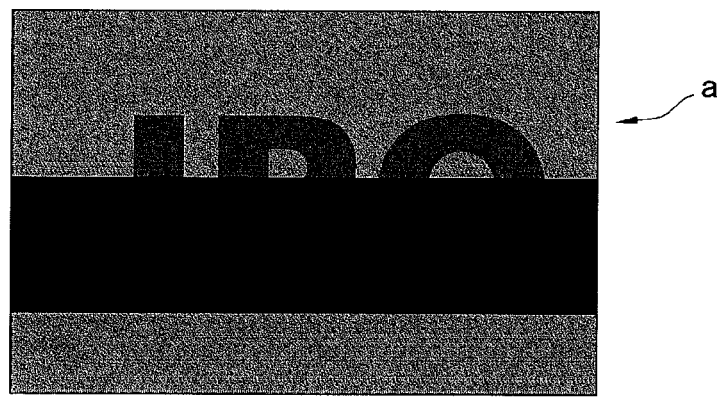
TIMING 2
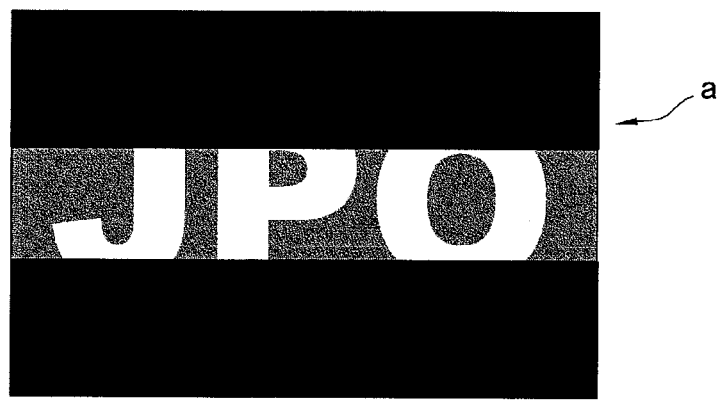
TIMING 3

FIG. 7
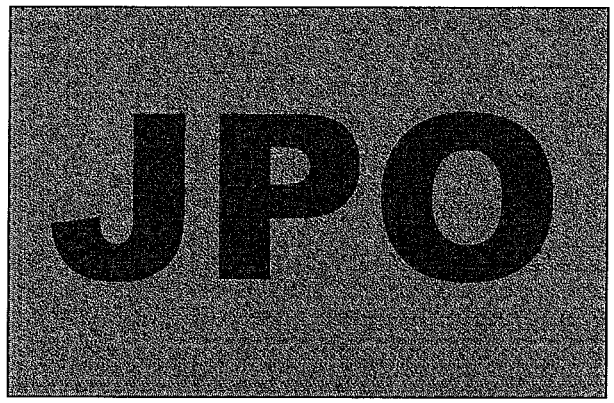
INFORMATION IMAGE
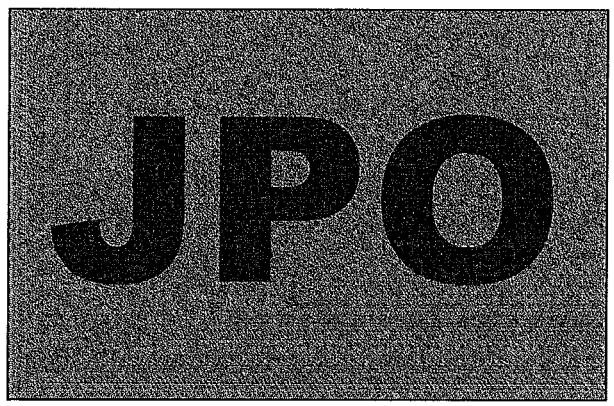
CONCEALMENT IMAGE
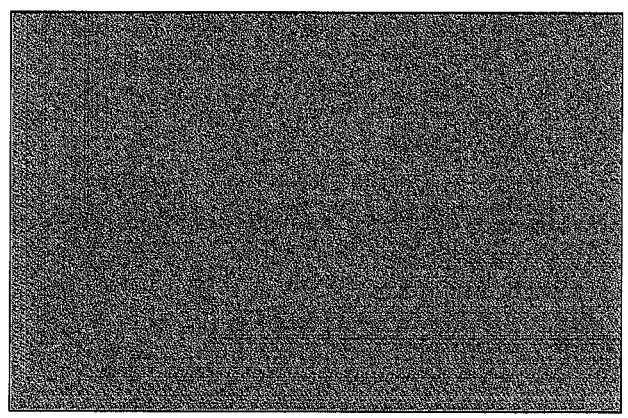
DISPLAY IMAGE FIG. 8
PATTERN 1 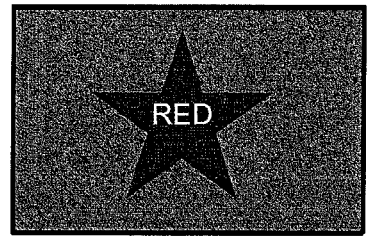
PATTERN 2 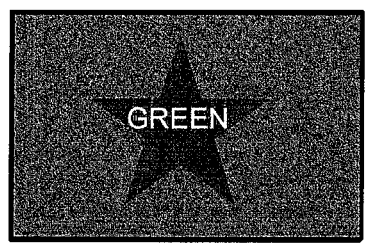
PATTERN 3 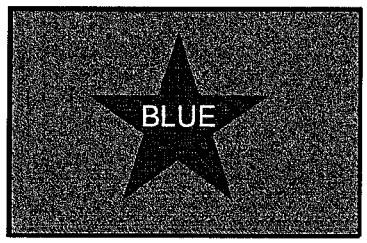
PATTERN 4 
PATTERN 5 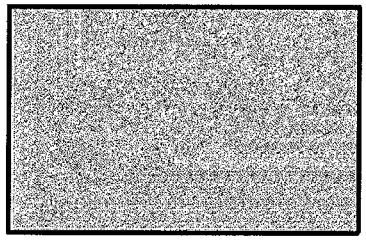

FIG. 9
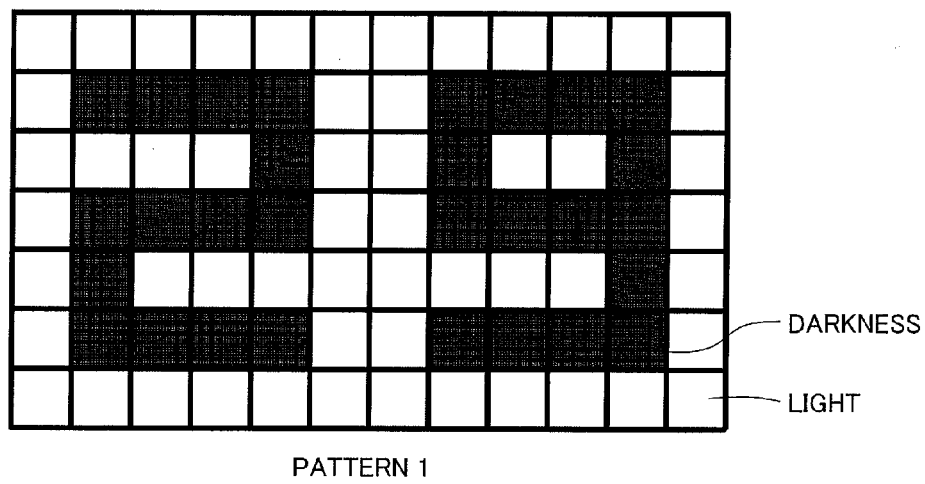
PATTERN 1
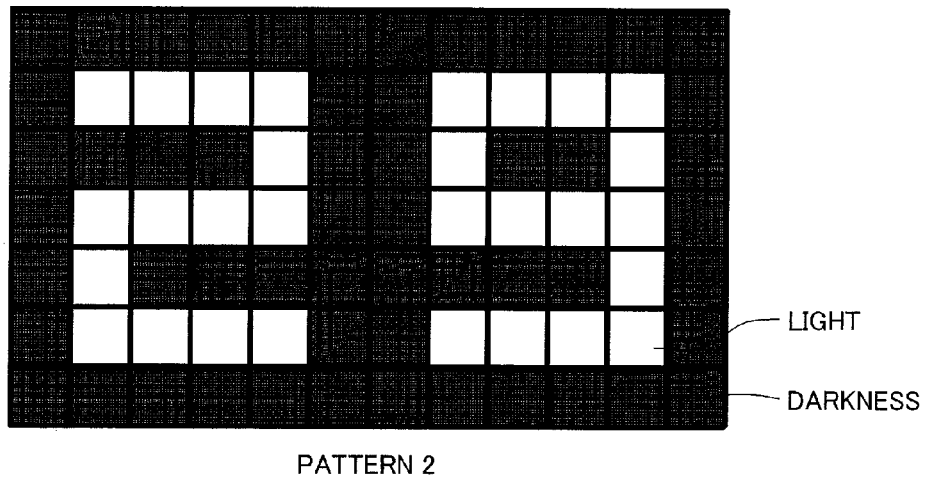
PATTERN 2

FIG. 10
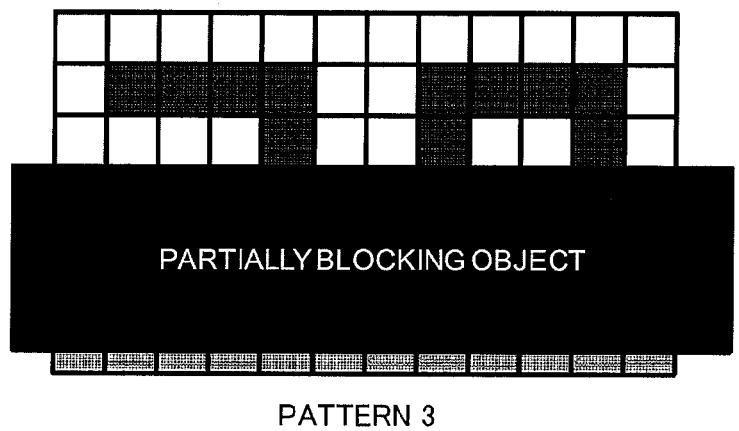
PATTERN 3
PATTERN 4
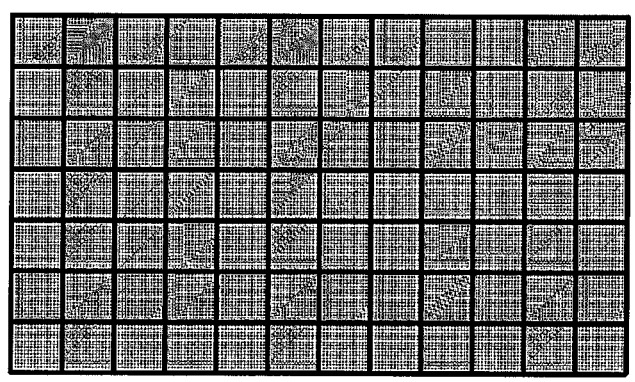
PATTERN 5

F I G. 1 2
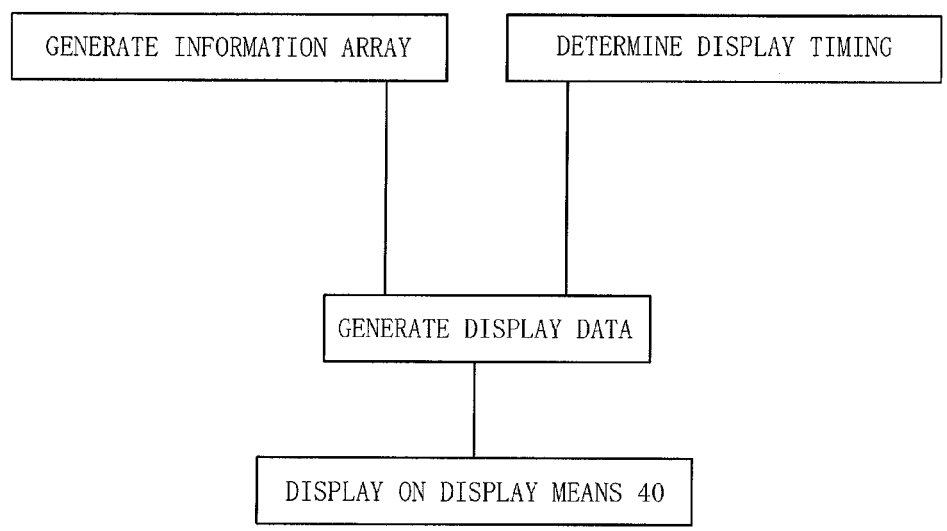

FIG. 13
(A) 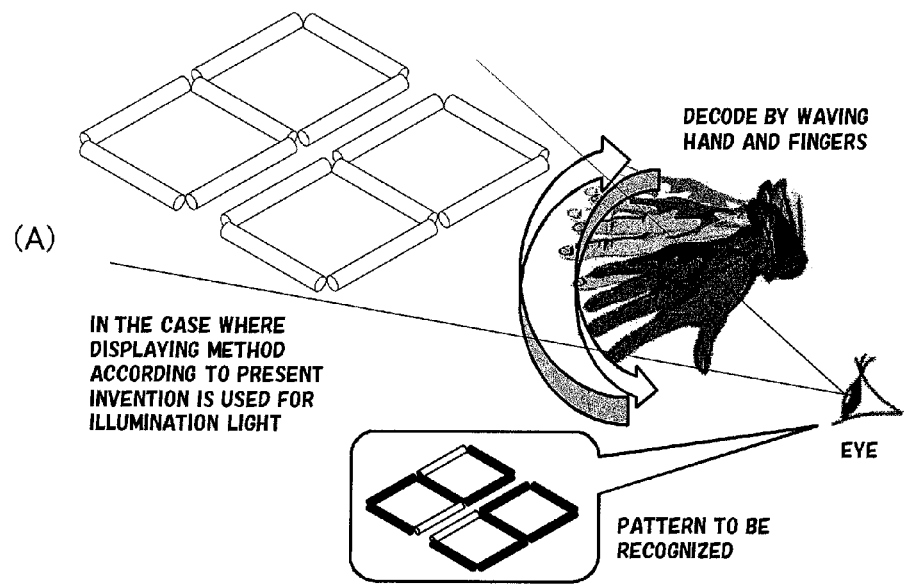
(B) 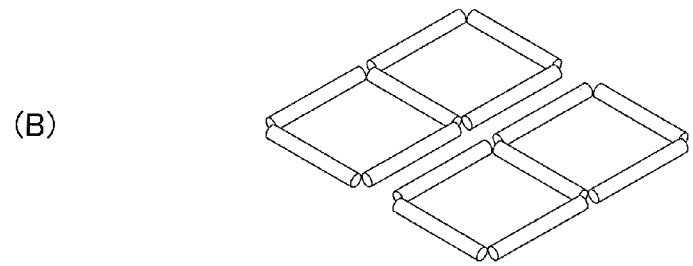
(C) 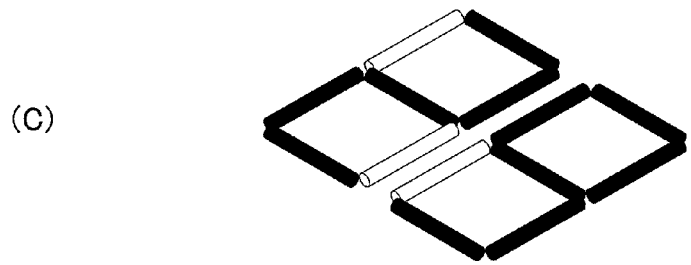

FIG. 14
(A) 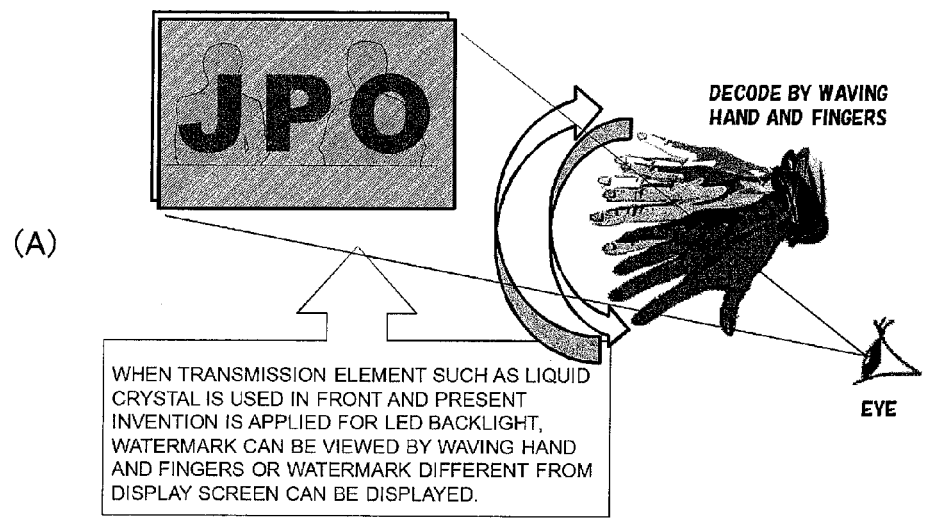
(B) 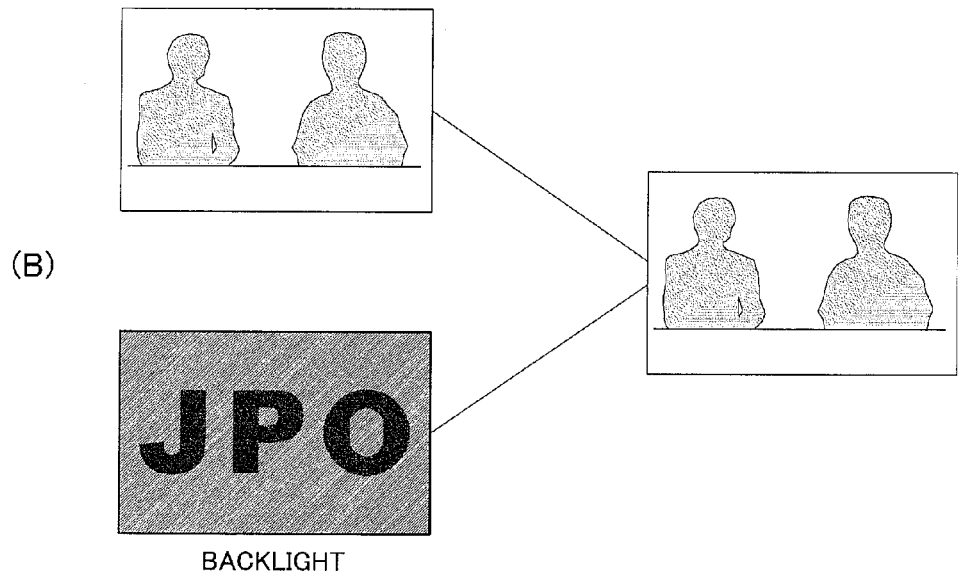

FIG. 17
PRIOR ART
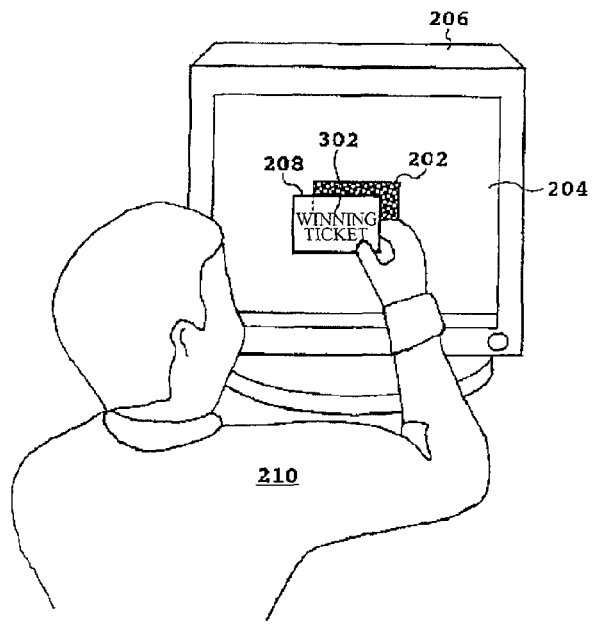
(A)
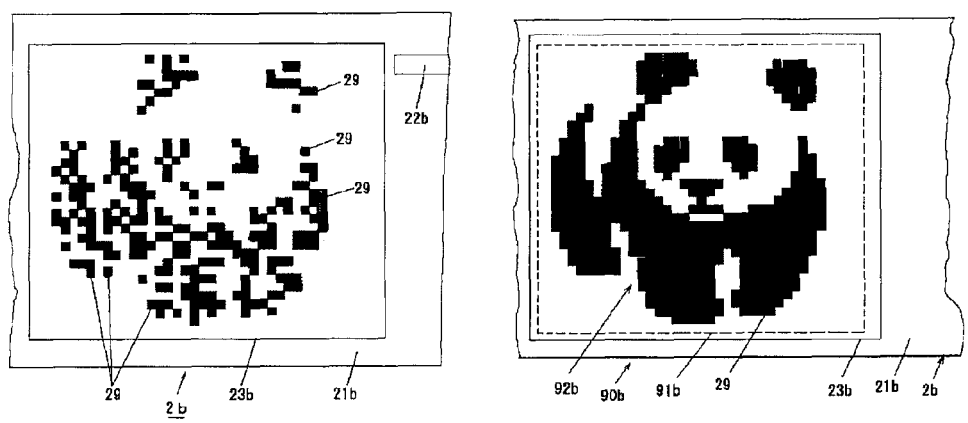
(B)

INFORMATION PROVIDING METHOD AND INFORMATION PROVIDING DEVICE

This application is a continuation of International Application No. PCT/JP2012/001438, filed Mar. 2, 2012, priority being claimed on Japanese Patent Application JP2011-047967 filed Mar. 4, 2011.

TECHNICAL FIELD

The present invention relates to a method for providing information and an apparatus for providing information and, more particularly, to a method for providing information and an apparatus for providing information with which people's attention can be attracted to a board, a display or the like having various information displayed thereon.

BACKGROUND ART

Conventionally, various advertising media that appeal to people's vision are used for publicity of companies or products. For example, billboards and signboards located in public places or the like, or television commercials have been widely adopted.

Since an object of advertisement is to be seen by people, leading to recognition of information of companies and products, various ideas have been suggested for attracting people's attention.
For example, as for signboards, a method for blinking a display or moving displayed information is employed. As for television commercials, various images can be provided compared with the signboards or the like. Therefore, viewers' attention is attracted by ideas such as giving not only images but also a story to contents.

Recently, various images can be provided other than televisions along with the spread of digital displays. Therefore, digital signage (electronic advertising system) spreads which displays images and information using a flat panel display, a projector or the like even in the outdoors. Then, various methods have been developed even in the field of digital signage in order to attract people's attention (Patent Literature 1, 2 and the like).

Patent Literature 1 discloses a technique for displaying advertisement details corresponding to an advertisement outline that is downloaded to a portable terminal of a person who is around a display screen.

Patent Literature 2 discloses a technique for changing display contents by receiving a signal from a portable terminal of a person who is viewing a display screen.

That is, the techniques in Patent Literatures 1 and 2 are for attracting person's attention to the display screen by changing the displayed contents on the display screen of the digital signage according to the person who is the most likely to view the screen.

On the other hand, as for digital signage with a large display provided on a wall surface of a building or the like, the same screen is simultaneously viewed by the general public, leading to difficulty in employing the techniques in Patent Literatures 1 and 2.

With digital signage using a small display provided in stores or on vending machines, eagerness to buy can be increased by employing the techniques in Patent Literatures 1 and 2. However, in the case of displaying an advertisement aim at specific people in such a situation that a plurality of people views the same display, interest of the others may be impaired. Situations in which the techniques in Patent Literatures 1 and 2 can be employed are therefore limited.

A technique for providing special information only to specific people has also been developed even in the case where the plurality of people views the same display (Patent Literature 3 to 6, or the like).

Patent Literatures 3 and 4 disclose techniques in which, as an image displayed on a display that shows information from a computer, a screen having information for providing to specific people displayed thereon (display target screen) and a screen in complementary color relationship with the display target screen (screen in complementary color) are prepared to be alternately displayed on the display, and therefore, people cannot recognize the display target screen when normally viewing the display (see FIG. 16). Patent Literatures 3 and 4 also disclose methods, as a method for reading information on the display target screen, in which special glasses are used and only a person who wears the glasses can read the information on the display target screen.

Patent Literatures 5 and 6 disclose techniques in which a concealment design including concealed information is displayed, and then the concealed information can be visually recognized by viewing the concealment design through a special card or the like (see FIG. 17).

By employing the above processing to images displayed on the large display according to such techniques, special information can be provided to people having the special glasses or the special card. That is, even in the case where the plurality of people views the same display, information that attracts specific people can be provided to the people.

CITATION LIST

Patent Literature

Patent Literature 1: Japanese Patent Laid-Open No. 2009-128498
Patent Literature 2: Japanese Patent Laid-Open No. 2010-176648
Patent Literature 3: Japanese Patent Laid-Open No. 5-119754
Patent Literature 4: Japanese Patent Laid-Open No. 6-118927
Patent Literature 5: Japanese Patent Laid-Open No. 2001-312657
Patent Literature 6: Japanese Patent Laid-Open No. 2002-344719

SUMMARY OF INVENTION

Technical Problem

As for the techniques in Patent Literatures 3 to 6, the information cannot be acquired without instruments such as the special glasses or the special card. According to the techniques in Patent Literatures 3 and 4, in particular, an image display and an operation of the glasses must be synchronized with each other, thereby requiring an environment where information concerning the screen display can be supplied to the glasses from a computer or the like. Thus, it is substantially difficult to employ the techniques in Patent Literatures 3 and 4 except for a specific environment such as inside a home and also difficult to apply the techniques to the digital signage.

Moreover, a person having a special instrument disclosed in the techniques in Patent Literatures 3 to 6 is interested in the information to some extent. If such techniques are employed, it is difficult to newly attract people's attention with respect to the digital signage. In other words, it is difficult to attract new interest from people who are not particularly interested in the information displayed on the digital signage according to the techniques in Patent Literatures 3 to 6.

In view of the above circumstances, an object of the present invention is to provide a method for providing information and an apparatus for providing information with which information can be secretly displayed, and further, a display technique with a lot of sense of fun can attract keen interest from people around a display such as digital signage.

Solution to Problem (Method for Providing Information)

A method for providing information according to a first feature of the present invention is a method for providing information using an apparatus for providing information that displays information using a light array, including: switching and displaying an information array and a concealment array in a cycle in which a person cannot sense an information display array of the information array using the apparatus for providing information, the information array including the information display array concerning information to be provided, the concealment array being generated so that the information display array becomes invisible when the concealment array overlaps with the information array; and intermittently blocking a visual field of the person so as to become asynchronous to a switching cycle in which the information array and the concealment array are switched and displayed.

A method for providing information according to a third feature of the present invention is the first feature of the present invention, further including: switching and displaying the plurality of information arrays and the plurality of concealment arrays corresponding to the respective information arrays using the apparatus for providing information.

A method for providing information according to a fourth feature of the present invention is the first or third feature of the present invention, further including: forming a complementary color relationship between a color of light of the information display array in the information array, and a color of light of an information concealment array overlapping with the information display array when the information array overlaps with the concealment array.

A method for providing information according to a fifth feature of the present invention is the first, third or fourth feature of the present invention, wherein, in the information array, a difference in luminance between the information display array and a background array other than the information display array increases, and in the concealment array, luminance in the information concealment array is similar to that of a background array in the information array, and luminance in a concealment background array other than the information concealment array is similar to that of the information display array.

A method for providing information according to a sixth feature of the present invention is the first, third, fourth or fifth feature of the present invention, further including: displaying a dummy array between timing of displaying the information array and timing of displaying the concealment array, wherein the dummy array has an array different from the information concealment array and the information display array at a location where the information display array in the information array and the information concealment array in the concealment array are displayed when the dummy array overlaps with the information array and the concealment array.

A method for providing information according to a seventh feature of the present invention is any one of the first to sixth features of the present invention, wherein the apparatus for providing information includes a display screen obtained by arranging a plurality of LED light sources, and the information array and the concealment array are switched at a display speed of 240 frames per second or more to be displayed on the display screen.

A method for providing information according to an eighth feature of the present invention is any one of the first to seventh features of the present invention, further including: adjusting the switching cycle of the information array and the concealment array to a speed at which the person can sense the information display array in the information array by light entering an eye without a light-blocking object in front of the eye when the person waves the light-blocking object in front of the eye.

(Apparatus for Providing Information)

An apparatus for providing information according to a ninth feature of the present invention is an apparatus that displays concealed information using a light array, the apparatus displaying the concealed information so that a person can recognize the concealed information without an apparatus for exclusive use of making the concealed information visible, including: display means for displaying information using a light array; and data generating means including an array generating portion that generates information array data and concealment array data, the information array data being for displaying, on the display means, an information array including an information display array concerning information to be provided, the concealment array data being for displaying, on the display means, the concealment array generated so that the information display array becomes invisible at the time of the concealment array overlapping with the information array, wherein the data generating means includes a display timing determining portion generating timing information concerning timing at which the display means displays each array, and the display timing determining portion generates timing information based on the information array data and the concealment array data so that a the information array and the concealment array are switched in a switching cycle in which the person cannot sense the information display array in the information array at the time of switching and displaying the information array and the concealment array.

An apparatus for providing information according to a tenth feature of the present invention is the ninth feature of the present invention, wherein the array generating portion includes a function for generating the plurality of information array data, and the plurality of concealment array data for displaying, on the display means, concealment arrays corresponding to information arrays displayed based on the respective information array data, and the display timing determining portion generates the timing information concerning timing at which the plurality of information array data and the plurality of concealment array data are displayed.

An apparatus for providing information according to an eleventh feature of the present invention is the ninth or tenth feature of the present invention, wherein the array generating portion generates the information array data and the concealment array data so that a color of light of the information display array in the information array is in a complementary color relationship with a color of light of an information concealment array overlapping with the information display array when the information array overlaps with the concealment array.

An apparatus for providing information according to a twelfth feature of the present invention is the ninth, tenth or eleventh feature of the present invention, wherein the array generating portion generates the information array data so that a difference in luminance between the information display array and a background array other than the information display array in the information array increases, and the array generating portion generates the concealment array data so that luminance in the information concealment array is similar to that of a background array in the information array, and luminance in a concealment background array other than the information concealment array in the concealment array is similar to that of the information display array.

An apparatus for providing information according to a thirteenth feature of the present invention is the ninth, tenth, eleventh or twelfth feature of the present invention, wherein the data generating means includes a function for generating dummy array data for displaying a dummy array on the display means, the dummy array has an array different from the information concealment array and the information display array at a location where the information display array in the information array and the information concealment array in the concealment array are displayed when the dummy array overlaps with the information array and the concealment array, and the display timing determining portion generates the timing information so that the dummy array is displayed between timing of displaying the information array and timing of displaying the concealment array.

An apparatus for providing information according to a fourteenth feature of the present invention is any one of the ninth to thirteenth features of the present invention, wherein the display means includes a display screen obtained by arranging a plurality of LED light sources, and the information array and the concealment array can be switched at a display speed of 240 frames per second or more to be displayed on the display screen.

An apparatus for providing information according to a fifteenth feature of the present invention is any one of the ninth to fourteenth features of the present invention, wherein the display timing determining portion generates the timing information so that, when a person waves a light-blocking object in front of an eye, each array data is displayed at timing when the person can sense the information display array in the information array by light entering the eye without the light-blocking object in front of the eye.

Advantageous Effects of Invention (Method for Providing Information)

According to the first feature of the present invention, the information array and the concealment array are switched to be displayed in the cycle in which the person cannot sense the information display array of the information array. This is because the concealment array is generated so that the information display array becomes invisible when overlapping with the information array. Therefore, the person cannot sense the information display array in the information array even when normally viewing a light array displayed by the apparatus for providing information. On the other hand, the person can sense the information display array if the light entering the person's eye from the light array displayed by the apparatus for providing information is appropriately and intermittently blocked. The information to be transmitted can therefore be secretly included in a normally displayed array (such as an image or a panel) for display. Since appropriately and intermittently blocking the light entering the person's eye is only required, the person can acquire the information to be transmitted without a special instrument. Then the person can sense the information display array in the information array displayed after blocking the concealment array or the concealment array displayed after blocking the information array. This is because a visual field of the person is intermittently blocked. Moreover, since the visual field is intermittently blocked so as to become asynchronous to the cycle of switching the information array and the concealment array, a part in the information display array or the like which the person senses changes depending on the timing of blocking each array. Then, the person can grasp the whole image of the information display array or the like by maintaining the state of intermittently blocking the visual field for a certain period of time.

According to the third feature of the present invention, a plurality of information can be concealed in the light array displayed by the apparatus for providing information for display. In particular, when the display cycle is switched every set of the information array and the concealment array, the person can acquire different information depending on the cycle of blocking. According to the fourth feature of the present invention, confidentiality of the information display array or the like in the information array can be increased. Moreover, when the light entering an eye is appropriately and intermittently blocked, a flicker of light and darkness at each array is not emphasized. In the case of blocking the light by waving the hand, a rainbow color is observed or the like depending on a speed of waving the hand, thereby advantageously increasing a pleasure.

According to the fifth feature of the present invention, confidentiality of the information display array or the like in the information array can be increased. Information can be concealed even in a single-color screen of red, blue or green, or even white backlight for illumination can be used for concealing information. Moreover, information can be advantageously provided using the same array to observers having different sensory properties of color.

According to the sixth feature of the present invention, the information display array or the like in the information array is prevented from being sensed by an accidental move such as moving the person's face or the like. This is because the dummy array is displayed between the timing of displaying the information array and the timing of displaying the concealment array.

According to the seventh feature of the present invention, the information array and the concealment array are switched at the display speed of 240 frames per second or more to be displayed. This more certainly enables the person not to sense the information display array or the like in the information array.

According to the eighth feature of the present invention, the person can sense the information display array or the like in the information array simply by waving a light-blocking object such as a hand. Further, the information display array or the like can be seen or not depending on the way of waving a hand or the like. Therefore, a game element can be imparted to an action of reading the information display array or the like. Then, when an image displayed using a light array such as digital signage in the outdoors includes the information array or the like, the general public can also acquire the information of the information display array or the like concealed in the image. If the concealed information is useful or interesting, the digital signage that may conceal such information can attract people's attention. Further, if there is a person waving a hand or the like to acquire the concealed information, even a person who does not know existence of the concealed information pays attention to the action of the person waving the hand or the like. This becomes a motivation of the person paying attention for viewing the digital signage, and therefore, an effect that the digital signage attracts people's attention can be enhanced.

(Apparatus for Providing Information)

According to the ninth feature of the present invention, the information array and the concealment array are switched to be displayed in the switching cycle in which the person cannot sense the information display array of the information array. This is because the concealment array is generated so that the information display array becomes invisible when overlapping with the information array. Therefore, the person cannot sense the information display array in the information array even when normally viewing a light array displayed by the apparatus for providing information. On the other hand, the person can sense the information display array if the light entering the person's eye from the light array displayed on the display means is appropriately and intermittently blocked. The information to be transmitted can therefore be secretly included in a normally displayed array (such as an image or a panel) for display. Since appropriately and intermittently blocking the light entering the person's eye is only required, the person can acquire the information to be transmitted without a special instrument.

According to the tenth feature of the present invention, a plurality of information can be concealed in the light array displayed by the apparatus for providing information for display. In particular, when the display cycle is switched every set of the information array and the concealment array, the person can acquire different information depending on the cycle of blocking.

According to the eleventh feature of the present invention, confidentiality of the information display array or the like in the information array can be increased. Moreover, when the light entering the eye is appropriately and intermittently blocked, a flicker of light and darkness at each array is not emphasized. In the case of blocking the light by waving the hand, a rainbow color is observed or the like depending on a speed of waving the hand, thereby advantageously increasing a pleasure. Further, the information to be concealed can be easily embedded in the array.

According to the twelfth feature of the present invention, confidentiality of the information display array or the like in the information array can be increased. Information can be concealed even in a single-color screen of red, blue or green, or even white backlight for illumination can be used for concealing information. Moreover, information can be advantageously provided using the same array to observers having different sensory properties of color.

According to the thirteenth feature of the present invention, the information display array or the like in the information array is prevented from being sensed by an accidental move such as moving the person's face or the like. This is because the dummy array is displayed between the timing of displaying the information array and the timing of displaying the concealment array.

According to the fourteenth feature of the present invention, the information array and the concealment array are switched at the display speed of 240 frames per second or more to be displayed. This more certainly enables the person not to sense the information display array or the like in the information array.

According to the fifteenth feature of the present invention, the person can sense the information display array or the like in the information array simply by waving the light-blocking object such as a hand. Further, the information display array or the like can be seen or not depending on the way of waving a hand or the like. Therefore, a game element can be imparted to an action of reading the information display array or the like. Then, when an image displayed using a light array such as digital signage in the outdoors includes the information array or the like, the general public can also acquire the information of the information display array or the like concealed in the image. If the concealed information is useful or interesting, the digital signage that may conceal such information can attract people's attention. Further, if there is a person waving a hand or the like to acquire the concealed information, even a person who does not know existence of the concealed information pays attention to the action of the person waving the hand or the like. This becomes a motivation of the person paying attention for viewing the digital signage, and therefore, an effect that the digital signage attracts people's attention can be enhanced.

BRIEF DESCRIPTION OF DRAWINGS

FIG. 1 is a schematic diagram of a method for providing information of the present invention.

FIG. 5 shows schematic diagrams in a state of blocking a field of vision.

FIG. 7 shows schematic diagrams illustrating one example of an information image and a concealment image formed by the apparatus for providing information 1 of the present invention in the case where colors of an information figure and an information background figure differ from each other.

FIG. 8 shows schematic diagrams illustrating one example of an information image and a concealment image formed by the apparatus for providing information 1 of the present invention in the case where colors of an information figure and an information background figure differ from each other.

FIG. 9 shows schematic diagrams illustrating one example of an information image and a concealment image formed by the apparatus for providing information 1 of the present invention in the case where an information figure and an information background figure differ from each other in luminance.

FIG. 10 shows schematic diagrams in a state of blocking a field of vision in the case where the information figure and the information background figure differ from each other in luminance.

FIG. 12 is a flowchart of an operation of the apparatus for providing information 1B of the present invention.

FIG. 13 shows diagrams illustrating one example of information provision according to the apparatus for providing information 1B of the present invention.

FIG. 14 shows diagrams illustrating one example of information provision according to the apparatus for providing information 1B of the present invention.

FIG. 17 shows schematic diagrams of a conventional technique.

DESCRIPTION OF EMBODIMENTS

Figure 2:
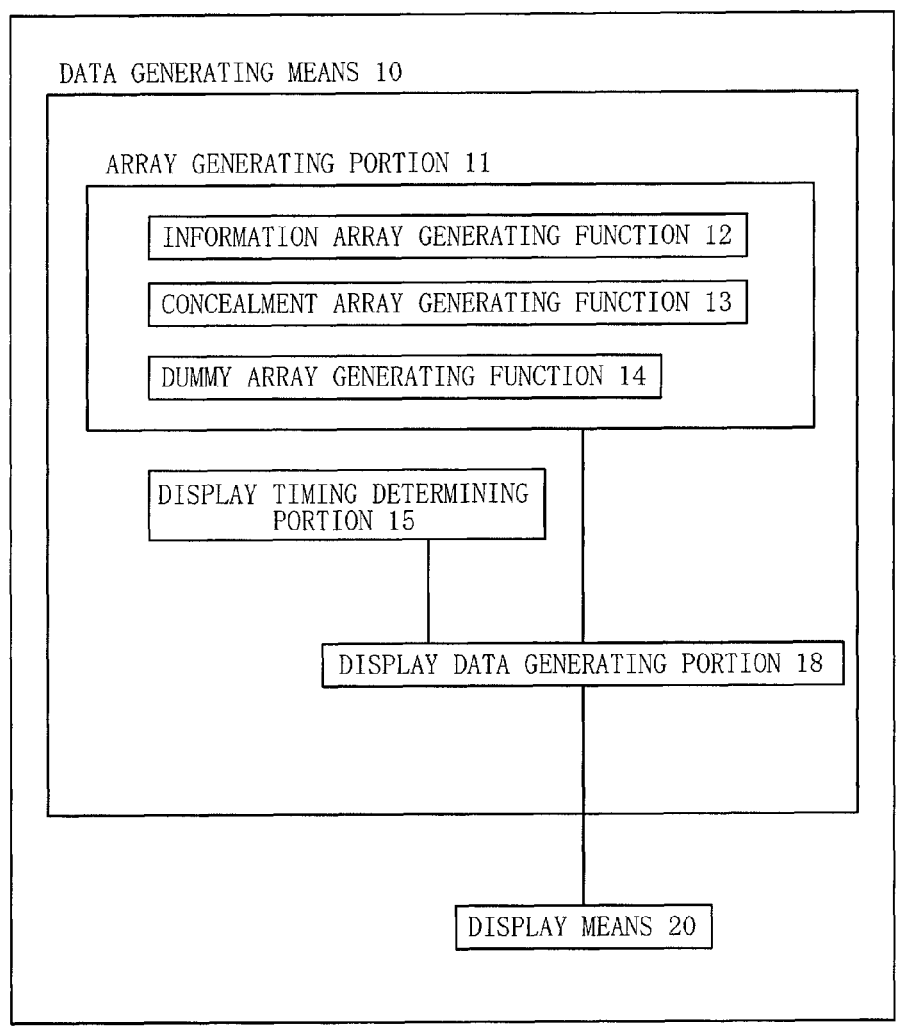
FIG. 2 is a schematic block diagram of an apparatus for providing information 1 of the present invention.

An embodiment of the present invention will be described now with reference to the drawings.

A method for providing information of the present invention is a method for providing information using an apparatus for providing information that displays information using a light array. The method for providing information is also a method for secretly displaying an array that includes specific information by switching displayed light arrays.

"Displaying information using a light array" in the present invention refers to displaying information such as numbers, letters, images and the like by arranging light having different wavelengths or different luminance. For example, "displaying information using a light array" refers to displaying information such as numbers, letters, images and the like on a display such as a cathode-ray tube, a liquid crystal display, a plasma display, a video projector or a display obtained by arranging a plurality of LED light sources. Alternatively, a plurality of images can be provided at high speed using a combination of these.

The concept of "displaying information using a light array" in the present invention also includes a case where an image or a letter is formed based on light from a plurality of light sources, not limited to a general display such as the above display. For example, in the case of arranging a plurality of fluorescent lamps, a number, a letter or an image may be formed by turning on a part of the fluorescent lamps and turning off a part of the fluorescent lamps. Thus, the concept of "displaying information using a light array" in the present invention also includes the case of displaying a number, a letter, an image and the like by turning on/off the plurality of fluorescent lamps in such a way.

In the following description of the method for providing information of the present invention, a case of employing a display obtained by arranging the plurality of LED light sources (hereinafter, simply referred to as an LED display) will be representatively described as a method for displaying a light array.

Obviously, the method for displaying a light array can employ the above various displays and the like.

(Method for Providing Information of the Present Invention)

The method for providing information of the present invention is a method for appropriately switching and displaying an information array in which light is arranged so as to display information to be provided and a concealment array in which light is arranged so as to conceal information of this information array. The light array in the information array includes an information display array in which light is arranged so as to display information to be provided.

For example, the information array and the concealment array are switched at high speed to be displayed (for example, 240 fps or more) on a display obtained by arranging the plurality of LED light sources (hereinafter, simply referred to as an LED display) by controlling on/off of the LED light sources of the LED display. Then, a person viewing the LED display cannot sense the whole information array, the whole concealment array and the information display array in the information array. The reason is described as follows. In a human visual system, light is sensed by visual cell firing.

However, after certain light (first incident light) enters an eye to cause the visual cell firing, a certain period must pass. Otherwise, even if next light (second incident light) enters the eye, the first incident light and the second incident light cannot be distinguished. In such a state, luminance, a color and the like of the light can be only sensed in the human visual system as if the first incident light and the second incident light enter simultaneously (in other words, the first incident light overlaps with the second incident light).

In the present description here, "a person cannot sense luminance, a color and the like of the light" refers to a state where differences in luminance and color of light cannot be distinguished as stimulation of a nerve.

In the present description here, "a person cannot recognize luminance, a color and the like of the light" refers to a state where differences in luminance and color of light can be distinguished at a stimulation level of the nerve but not at a human level of consciousness. According to a definition of the present description, a level at which a subliminal effect is exerted corresponds to a level at which "a person can sense luminance, a color and the like of the light" but "a person cannot recognize luminance, a color and the like of the light".

The information array and the concealment array are switched and displayed in the above cycle. In such a case, the visual cell firing cannot follow even if the information array is displayed after the light including the concealment array is displayed. Then, the human visual system senses that an array with the information array and the concealment array overlapping each other is displayed on the LED display. Therefore, in the case of the above display cycle of the concealment array and the information array, the person viewing the LED display substantially recognizes that an image formed by overlapping both images is displayed on the LED display.

Here, assume that the concealment array and the information array have the same array, and a color of light of the information display array in the information array is in a complementary color relationship with a color of light of an array corresponding to the information display array of the information array in the concealment array (information concealment array). For example, the information display array is displayed in red and the information concealment array is displayed in blue-green, while a part other than the information display array and the information concealment array in the information array and the concealment array is displayed in a color obtained by combining the both (light gray).

When such concealment array and information array are alternately switched and displayed, the person viewing the LED display sees as if a light gray solid color is displayed. When a light-blocking object is waved between the LED display and an eye in such a state, light from the LED display is blocked due to the light-blocking object in front of the eye. After that, the light-blocking object is moved away from the eye, and thereby the light from the LED display (re-irradiation light) enters the eye again. Then, the visual cell that the light once stops entering turns into a firing state by the re-irradiation light. When the light from the LED display is blocked immediately after the re-irradiation light causes the visual cell to fire, the visual cell is in a state as if only the re-irradiation light enters the visual cell. Therefore, the person can sense the re-irradiation light. If timing of blocking the light with the light-blocking object is appropriate, the light emitted from the LED display can enter the eye with the person being able to sense only the information array or the concealment array.

However, even if the timing of blocking the light with the light-blocking object is appropriate, the person can sense the information display array or the information concealment array to some extent but cannot recognize the information of the information display array or the like with only one wave of the light-blocking object. This is because information of the information display array or the like that the person can sense and recognize (decode) at the time of waving the light-blocking object once is only an extremely limited part of the information display array or the like.

Thus, a visual field of the person is intermittently blocked by repeatedly waving the light-blocking object between the LED display and the eye. In that case, the state where the visual cell senses only the information display array of the information array or the information concealment array of the concealment array is repeated (see FIG. 1). Although the person cannot clearly recognize the whole image of the information display array or the information concealment array at each array, the information display array and the information concealment array are generated at the same location, and therefore, partial recognition of the both arrays is repeated. Then, the person can recognize the whole image of the information display array and the information concealment array based on fragmentary parts partially recognized.

According to the method for providing information of the present invention as described above, information to be transmitted can be secretly included in a normally displayed array (such as an image) to be displayed on the LED display or the like.

Further, the person can acquire the information to be transmitted simply by appropriately and intermittently blocking the light that enters the person's eye from the LED display or the like. That is, the person can acquire the information to be transmitted without a special instrument. For example, the person can sense the information display array or the like in the information array simply by waving the light-blocking object such as a hand.

In the above case (in the case where the concealment array and the information array have the same array and differ from each other in color or the like), when one of the information array and the concealment array becomes the information array, the other array becomes the concealment array.

Further, if timing at which the light enters the eye again after the light-blocking object blocks the light does not coincide with timing of switching displays of the information array and the concealment array at a certain probability, the person cannot recognize the information display array or the like even though the person can sense the information display array or the like. For example, the information display array or the like can be seen or not depending on the way of waving a hand or the like. Therefore, a game element can be imparted to an action of reading the information display array or the like.

Then, when an image displayed using a light array such as digital signage in the outdoors includes the information display array, the general public can also acquire the information of the information display array concealed in the image. If the concealed information is useful or interesting, the digital signage that may conceal such information can attract people's attention.

Further, if there is a person waving a hand or the like to acquire the concealed information, even a person who does not know existence of the concealed information pays attention to the action of the person waving the hand or the like. This becomes a motivation of the person paying attention for viewing the digital signage, and therefore, an effect that the digital signage attracts people's attention can be enhanced.

A boundary between the information display array and a part other than the information display array (information background array) is easily recognized. Therefore, when confidentiality is increased, it is preferred that the information background array has a random texture or is an image having a spatial frequency component to the same extent of the information display array. In particular, the boundary between the information display array and the information background array preferably has the same color or the same luminance as a corresponding location in the concealment array. For example, in the case where the information array and the concealment array are images, a pixel value in a pixel at the boundary preferably has the same color or the same luminance as a pixel value at the corresponding location in the concealment array.

On the contrary, in the case where a person can easily acquire (decode) the information display array, a contrast of the boundary between the information display array and the information background array is preferably high.

(Apparatus for Providing Information of the Present Invention)

Now, description will be made on an apparatus for providing information 1 that can realize the above method for providing information of the present invention.

In the apparatus for providing information 1, information displayed using a light array includes an image and a letter string. Hereinafter, description will be made on the case where the information displayed using the light array is an image as an example. That is, the above information array corresponds to an information image; the concealment array to a concealment image; the information display array in the information array to an information figure; the information concealment array in the concealment array to an information concealment figure. Moreover, the information background array in the information array corresponds to an information background figure, while a concealment background array in the concealment array corresponds to a concealment background figure.

As shown in FIG. 2, the apparatus for providing information 1 of the present invention includes display means 20 for displaying an image using a light array, and data generating means 10 for supplying information to be displayed to the display means 20.

(Display Means 20)

The display means 20 can display an image using the light array. The display means 20 includes, for example, a cathode-ray tube, a liquid crystal display, a plasma display, a video projector and a display obtained by arranging a plurality of LED light sources. As described above, one having a plurality of light sources can be used as the display means 20.

Although the above described ones can be used as the display means 20, it is preferable to employ one that has a display screen or the like obtained by arranging a plurality of LED light sources and can display an image or the like on the display screen at a display speed of 480 frames per second or more. When an image or the like can be displayed at such a display speed, the display speed of each image is 240 frames per second or more at the time of displaying the information image and the concealment image alternately. Since time resolution of a human eye is on the order of 15 to 60 Hz, a person cannot recognize the information image and the concealment image individually. Therefore, it is more certain that the person cannot sense an information figure in the information image.

(Data Generating Means 10)

The data generating means 10 includes an array generating portion 11, a display timing determining portion 15 and a display data generating portion 18.

(Array Generating Portion 11)

The array generating portion 11 includes an information array generating function 12 and a concealment array generating function 13 for generating image data of a base of an image displayed on the display means 20. The array generating portion 11 also transmits data of both images generated by the both functions to the display data generating portion 18.

(Information Array Generating Function 12)

The information array generating function 12 is a function of generating data of the information image having an information figure with information to be provided embedded therein (information image data). More specifically, the information array generating function 12 generates the information image data concerning an information image having information provided from information supply means (such as USB or the Internet) (not shown) embedded as an information figure.

Figure 4:
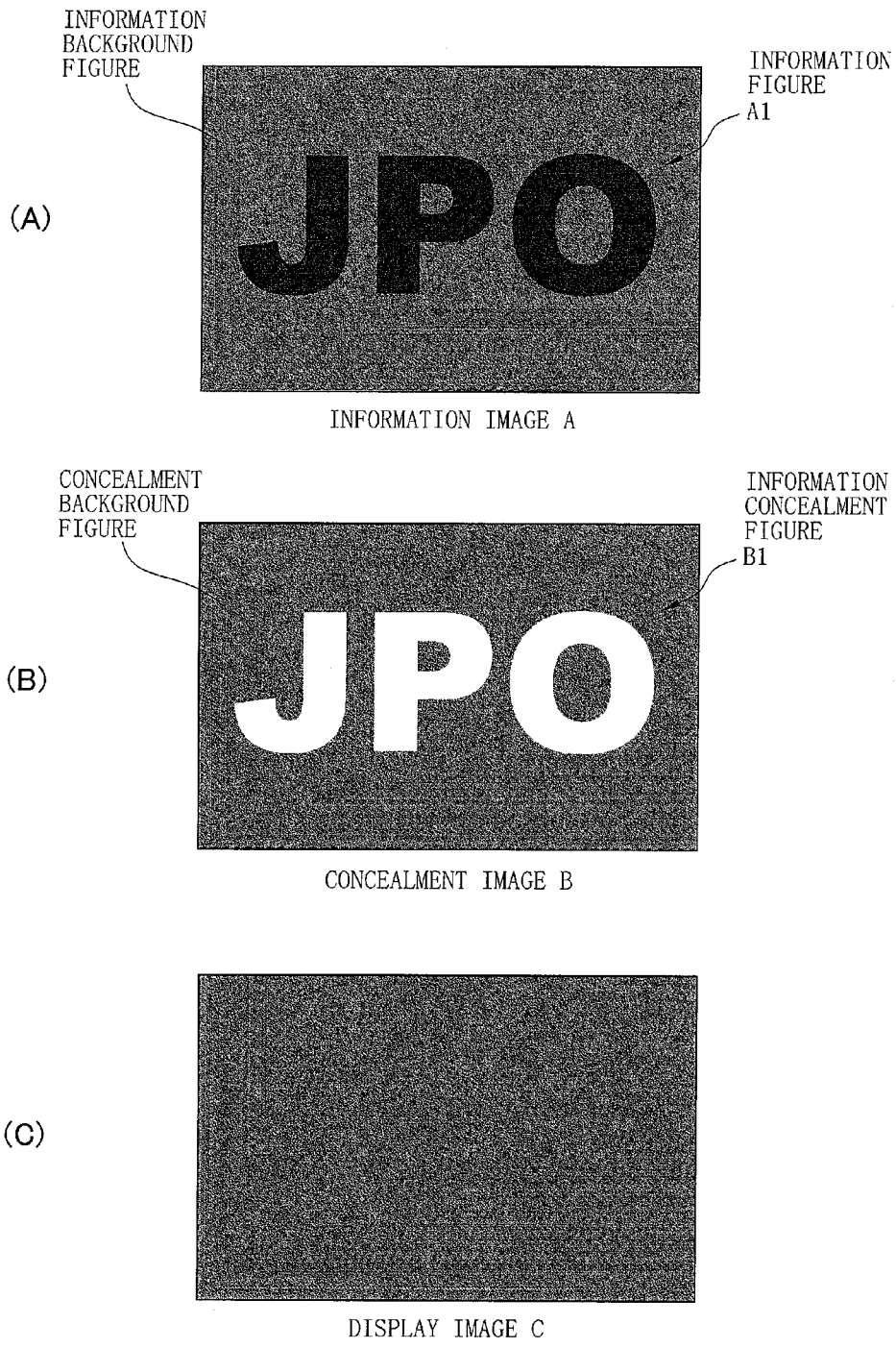
FIG. 4 shows diagrams illustrating one example of an information image and a concealment image.

For example, when information to be provided is letters "JPO", the information array generating function 12 generates the information image data so that a person can visually recognize the letters "JPO" if an information image shown in FIG. 4 is successively displayed on the display means 20.

As for the information image, a method for allowing the person to visually recognize the information figure such as the letters "JPO" is not particularly limited. For example, a method for alternately changing colors of the information figure and the background, a method for alternately changing luminance of the information figure and the background, or the like can be employed. In particular, in the case of alternately changing colors of the information figure and the background, both colors are in the complementary color relationship. In that case, the person can easily sense and recognize the information figure because the boundary between the information figure and the background can be emphasized.

The information array generating function 12 may generate only information figure data concerning the information to be provided. In such a case, in the display means 20, the information figure data is simply required to include data that has specified where to display the information figure with which luminance and which color. As for the information image shown in FIG. 4, for example, the information figure data is simply required to include data concerning the color and luminance of the letters "JPO", and a location in the image.

(Concealment Array Generating Function 13)

The concealment array generating function 13 is a function for generating data of a concealment image switched with the information image and displayed on the display means 20 (concealment image data). In other words, the concealment array generating function 13 generates the concealment image data for causing the display means 20 to display the concealment image displayed for concealing the information image.

Preferably, the concealment image has the same image as the information image and is an image generated so that the information figure becomes invisible when overlapping with the information image.

More specifically, as shown in FIG. 4, when the concealment image is displayed on the display means 20, one having an information concealment figure displayed at the same location as the information figure in the information image is regarded as the concealment image. Then, in the information image, when the information figure can be visually recognized by alternately changing colors of the information figure and the background, a color obtained when the information concealment figure in the concealment image overlaps with the information figure in the information image is the same color (overlapping color) obtained when the concealment background figure in the concealment image overlaps with the information background figure in the information image. In such a case, if the concealment image and the information image are alternately displayed in the same cycle, it is more difficult to visually recognize the information figure because the image displayed on the display means 20 has only one overlapping color.

For example, assume that the information figure and the information background figure in the information image are in the complementary color relationship (for example, red and blue-green, yellow and bluish purple, and the like). If the color of the information concealment figure in the concealment image is in the complementary color relationship with the color of the information figure in the information image, and the color of the concealment background figure in the concealment image is in the complementary color relationship with the color of the information background figure in the information image, it is further difficult to visually recognize the information figure. Since the color of the image displayed on the display means 20 changes at high speed, a luminance contrast is not provided compared with a case where light and darkness is switched at high speed (that is, compared with a case where luminance is changed as described later). This is because, when only a color changes, a certain amount of light constantly enters an eye. Therefore, when the light entering the eye is appropriately and intermittently blocked with the displayed images switching at high speed, a flicker of light and darkness at each array is not emphasized.

Further, assume that the information figure can be visually recognized by alternately changing luminance of the information figure and the information background figure in the information image. In that case, luminance obtained when the information concealment figure in the concealment image overlaps with the information figure in the information image is simply required to be the same luminance (averaged luminance) obtained when the concealment background figure in the concealment image overlaps with the information background figure in the information image.

In such a case, even if the information image or the concealment image is a single-color screen such as red, blue or green, an information figure can be secretly embedded in such a screen. Further, white illumination such as backlight can also be used for concealing the information figure, as described later. Then, information can be provided using the same array to observers having different sensory properties of color.

As described above, when the information array generating function 12 generates the information image data only having the data of the information image, the concealment array generating function 13 may also generate, as the concealment image data, data only having the data of the information concealment figure generated so that the information figure becomes invisible when the information concealment figure overlaps with the information figure. In this case, in the display means 20, the concealment image data is simply required to include data that has specified where to display the information concealment figure with which luminance and which color.

When the information image data having only the data of the information figure and the concealment image data having only the data of the information concealment figure are generated individually, any one of the information array generating function 12 and the concealment array generating function 13 may supply data of an image in which the information figure or the information concealment figure is embedded (hereinafter, referred to as background image data) to the display data generating portion 18. Alternatively, the background image data may be supplied to the display data generating portion 18 from the outside separately.

When any one of the information image data and the concealment image data has the background image data, the information figure or the information concealment figure included in the other data is simply required to be embedded in the background image displayed based on the background image data in the display data generating portion 18. For example, when the information image data has the data of the information image and the background image, the information concealment figure is only required to be embedded in the background image displayed based on the background image data.

(Display Timing Determining Portion 15)

The display timing determining portion 15 determines timing of displaying the information image and the concealment image to generate information concerning the timing (timing information). The display timing determining portion 15 also transmits the generated timing information to the display data generating portion 18.

The timing information includes information concerning in which cycle the information image and the concealment image are switched in the display means 20.

A cycle in which each image of the information image and the concealment image is displayed is not particularly limited. For example, the cycle of displaying the information image may differ from the cycle of displaying the concealment image. However, in order to increase the confidentiality of the information figure, the information image and the concealment image are preferably displayed alternately in the same cycle.

In particular, as for the timing of displaying the information image and the concealment image, assume that a person normally views the display means 20 and then waves the light-blocking object with the person's hand in front of the eye. In that case, it is preferred that the person can sense the information figure in the information image or the information concealment figure in the concealment image by light entering the eye without the light-blocking object in front of the eye based on the above described principle. In such a case, the person can advantageously sense and recognize the information figure or the like in the information image simply by waving the light-blocking object such as a hand without a special instrument.

(Display Data Generating Portion 18)

The display data generating portion 18 generates display data for displaying an image on the display means 20 based on the information image data and the concealment image data transmitted from the array generating portion 11, and the timing information transmitted from the display timing determining portion 15. The display data generating portion 18 also transmits the generated display data to the display means 20.

In the display data generating portion 18, the concealment image is subjected to processing of light reduction based on the timing information. More specifically, assume that an amount of light at the time of displaying the concealment image for one second is F1 and the number of displayed concealment images is T1 fps. The concealment image data is modified so that the amount of light at the time of displaying the concealment image once becomes F1/T1.

Similarly, when the number of the displayed information images is T2 fps, the information image data is modified based on the timing information so that the amount of light at the time of displaying the information image once becomes F2/T2 where F2 indicates an amount of light at the time of displaying the information image for one second.

The modified concealment image data is combined with the modified information image data, and further, display data adjusted so that the modified concealment image data and the modified information image data are displayed in a predetermined order is generated. For example, the display data is generated so that the modified concealment image data and the modified information image data are displayed alternately.

Only the data of the information figure is the information image data, and the background image data is supplied to the display data generating portion 18 aside from the data of the information figure. In that case, in the display data generating portion 18, the background image is subjected to the above processing of light reduction based on the timing information, and further, display data is generated by embedding the information figure in the background image. More specifically, the display data is generated so that T1 of background images subjected to the processing of light reduction are successively displayed. At this time, the information figure is embedded in the specific background image. That is, the display data is generated by embedding the information figure in the background image every cycle in which the information image included in the timing information is displayed. The case where the background image data is supplied aside from the data of the information figure includes a case where the concealment image has both of the background image and the information concealment figure. In this case, the information figure is substituted for the information concealment figure in the concealment image with respect to the specific concealment image as the processing of embedding the information figure in the background image.

Only the data of the information concealment figure is the concealment image data, and the background image data is supplied to the display data generating portion 18 aside from the data of the information concealment figure. In that case, in the display data generating portion 18, the background image is subjected to the above processing of light reduction based on the timing information, and further, display data is generated by embedding the information concealment figure in the background image. More specifically, the display data is generated so that T1 of background images subjected to the processing of light reduction are successively displayed. At this time, the information concealment figure is embedded in the specific background image. That is, the display data is generated by embedding the information concealment figure in the background image every cycle in which the concealment image included in the timing information is displayed. The case where the background image data is supplied aside from the data of the information concealment figure includes a case where the information image has both of the background image and the information figure. In this case, the information concealment figure is substituted for the information figure in the information image with respect to the specific information image as the processing of embedding the information concealment figure in the background image.

Further, the display data generating portion 18 may generate the display data with an amount of data displayed on the display means 20 for one second as one unit to supply the display data to the display means 20 every one unit. The display data generating portion 18 may also successively supply the information image and the concealment image in a predetermined cycle, that is, in a predetermined order to the display means 20. Further, one unit is not limited to the amount of data displayed for one second, and an amount of data displayed for 1/60 to for 1/120 may be regarded as one unit.

(Effect of the Present Invention)

An effect of the method for providing information of the present invention using the apparatus for providing information 1 of the present invention will be described now.

Hereinafter, description will be made on the case where letter information "JPO" is embedded as the information figure in a solid background.

Information to be provided, that is, the letter information "JPO" is first supplied to the data generating means 10 in the apparatus for providing information 1 of the present invention.

Figure 3:
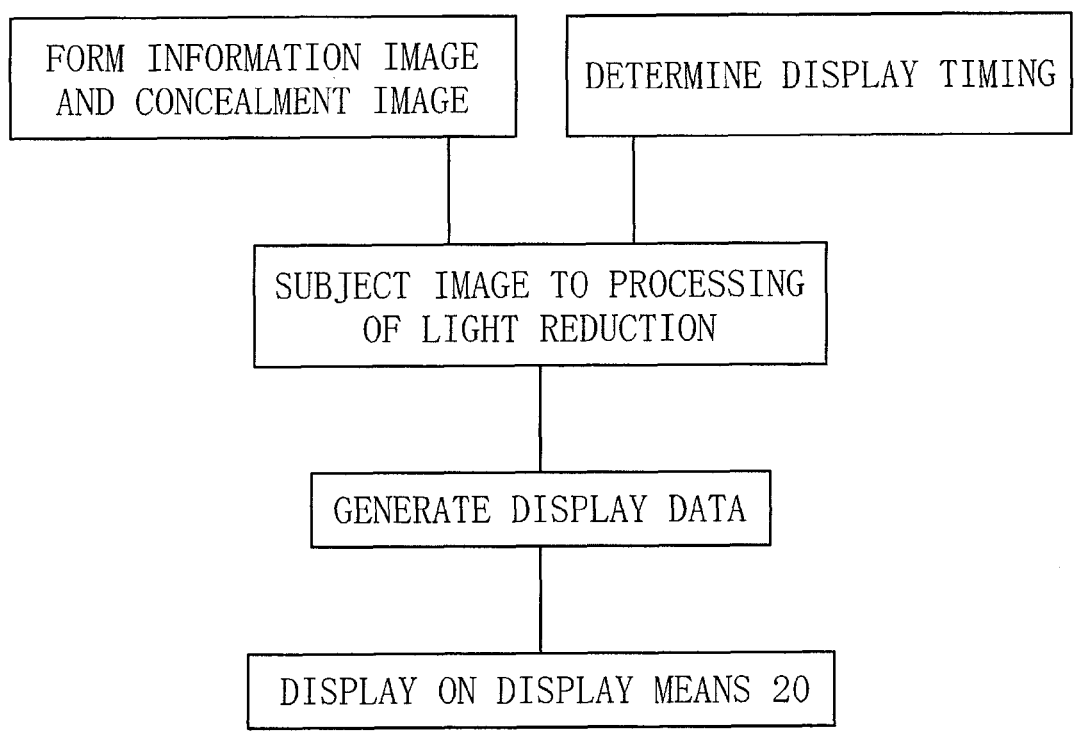
FIG. 3 is a flowchart of an operation of the apparatus for providing information 1 of the present invention.

Then, as shown in FIG. 3, the information array generating function 12 in the data generating means 10 generates information image data for displaying an information image A (see FIG. 4(A)). In this information image data, the letters "JPO" are embedded as an information figure A1 in a solid background, while being able to be distinguished from the background.

On the other hand, the concealment array generating function 13 in the data generating means 10 generates concealment image data for displaying a concealment image B based on the information image A (see FIG. 4(B)). In this concealment image data, the letters "JPO" are embedded as an information concealment figure B1 in a solid background, while being able to be distinguished from the background. In this concealment image B, a color of the background is adjusted so as to be the same color as the background of the information image A, and a color of the information concealment figure B1 is adjusted so as to be the same color as the background when the information concealment figure B1 overlaps with the information figure A1 for display.

Meanwhile, the display timing determining portion 15 in the data generating means 10 determines a switching cycle in which the information image A and the concealment image B are switched and displayed, and generates timing information. This switching cycle is adjusted so that a person cannot visually recognize the information figure A1 of the information image A, that is, the letters "JPO" when the information image A and the concealment image B are switched and displayed on the display means 20. For example, the switching cycle is set to be 240 fps or more.

The display data generating portion 18 is supplied with the information image data and the concealment image data from the information array generating function 12 and the concealment array generating function 13, and is supplied with the timing information from the display timing determining portion 15, thereby generating display data.

More specifically, in the display timing determining portion 15, the information image in the information image data and the concealment image in the concealment image data are subjected to the processing of light reduction, and thereby modified information image data and modified concealment image data are generated. Then, the display data is generated so that the information image A is displayed on the display means 20 in a predetermined cycle based on the modified information image data, while, at the timing other than this, the concealment image B is displayed on the display means 20 based on the modified concealment image data.

When the display data is transmitted to the display means 20, the information image A and the concealment image B are displayed on the display means 20 based on the display data. Since the information image A and the concealment image B are alternately switched at high speed to be displayed, a person viewing the display means 20 recognizes as if the information image A and the concealment image B overlap with each other to be displayed simultaneously. That is, the person recognizes as if a solid color image is displayed on the display means 20 (FIG. 4(C)).

Here, assume that the person views the display means 20 on which both of the images are alternately switched at high speed to be displayed based on the display data. If the person waves the light-blocking object in front of the eye as shown in FIG. 1, light entering the person's eye from the display means 20 is instantaneously and intermittently blocked. For example, if the person waves a hand having space between fingers in front of the eye, the light entering the person's eye from the display means 20 is instantaneously and intermittently blocked.

For example, as shown in FIG. 5, light entering the person's eye from a certain region (region a) in the image on the display means 20 is blocked at a certain timing 1. Since the light-blocking object is moving in front of the person's eye, light from the region a whose light is blocked at the timing 1 enters the person's eye at timing 2 immediately after the timing 1. Then, the light from the region a is blocked again at timing 3 immediately after the timing 2. That is, light of the concealment image B displayed on the display means 20 does not enter the person's eye at the timing 3. Since the person can sense the light entering the eye from the region a at the timing 2, the person senses a part of the letter string "JPO" of the information figure A1 on the display means 20 (see FIG. 5, timing 2)

In the above circumstance, even if the person sense the part of the letter string "JPO" of the information figure A1, it is difficult for the person to recognize the part as the part of the letter string "JPO". However, when the above circumstance, that is, the state where the person can sense a part of the letter string "JPO" is repeated, the person cannot clearly recognize the whole image of the letters "JPO", but can recognize existence of some letter string.

When timing of blocking the light with the light-blocking object is not synchronized with the cycle of switching the information image A and the concealment image B, which part of the information figure A1 in the information image A or the information concealment figure B1 in the concealment image B can be viewed or which part at which timing can be viewed changes every moment. Then, each part of the letter string "JPO" of the information figure A1 and the information concealment figure B1 is repeatedly and randomly sensed as fragmentary parts. Therefore, the person can recognize the whole image of the letters "JPO" based on the recognized fragmentary parts of the letters "JPO".

Further, if timing at which the light enters the eye again after the light-blocking object blocks the light does not coincide with timing of switching the information image A and the concealment image B at a certain probability, the person cannot recognize the letters "JPO" even though the person can sense the information figure A1 and the information concealment figure B1. For example, the letters "JPO" can be seen or not depending on the way of waving a hand or the like. Therefore, a game element can be imparted to an action of reading the letters "JPO" (that is, the concealed information).

(In the Case of Using a Plurality of Sets)

In the above example, the description has been made on the case where a set of one information image A and one concealment image B is repeatedly displayed. However, a plurality of sets each including the pair of information image and concealment image may be appropriately switched to be displayed. In this case, if switching cycles of the respective sets differ from each other and the cycles significantly differ from each other, only specific information can be recognized depending on a method for blocking light in the case of concealing a plurality of different information.

(Dummy Array Generating Function)

As shown in FIG. 2, a dummy image may be formed by providing a dummy array generating function 14 on the array generating portion 11.

As described above, assume that the concealment image is formed so as to have an overlapping color or averaged luminance when the concealment image and the information image overlap with each other, and then these two images are alternately displayed on the display means 20. Then, the information figure in the information image or the information concealment figure in the concealment image may be accidentally sensed when the person viewing the display means 20 accidentally moves such as moving the person's face or the like. If the dummy image is formed and displayed between the timing of displaying the concealment image and the timing of displaying the information image, such a problem can be prevented.

The dummy image can be a solid color image similar to a display image C in FIG. 4(C), for example. However, the dummy image may be any as long as it has a figure different from the information figure and the information concealment figure at a location where the information figure in the information image and the information concealment figure in the concealment image are displayed, not particularly limited.

Obviously, the display timing determining portion 15 generates timing information so that the dummy image is displayed between the timing of displaying the concealment image and the timing of displaying the information image in the case of displaying the dummy image.

(Method for Blocking Light)

Figure 6:
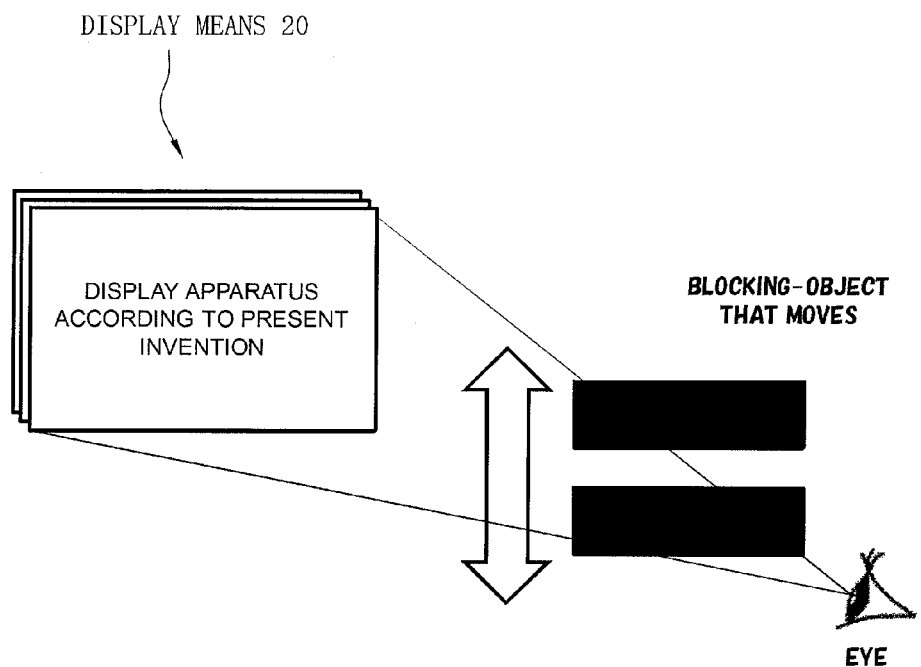
FIG. 6 is a schematic diagram illustrating another method for blocking light.

As a method for blocking light with a light-blocking object, various methods can be employed other than the method for waving a hand and fingers in front of the eye. For example, a similar effect can be obtained by providing a slit on a fan (see FIG. 6) and waving this fan in front of the eye. Alternatively, a similar effect can be obtained by mechanically moving the light-blocking object such as an electric fan. In the case of mechanically moving the light-blocking object, information can be certainly and advantageously obtained because the light-blocking object can block the light in a certain cycle. On the other hand, in the case of a person moving a hand, a fan or the like, the information cannot be certainly viewed, however, a game element can be advantageously imparted to an action of viewing the information.

(In the Case of Using Complementary Color)

Description will be made on an example where the information figure and the information background figure in the information image are in the complementary color relationship with reference to FIGS. 7 and 8.

As shown in FIG. 7, a background of the information image is gray and the letters "JPO" is red, while a background of the concealment image is gray and the letters "JPO" is cyan having the complementary color relationship with red. When such information image and concealment image are switched at high speed to be displayed on the display means 20, as to the "JPO" part, a person recognizes as if red and cyan overlaps with each other and cannot distinguish the both images from each other. Then, the person also recognizes as if the "JPO" part is gray, and therefore, the "JPO" part becomes gray and melts into the background to become like a latent image. Then, the person cannot recognize the letters "JPO" even when viewing the display means 20. When the person views the display means 20 with its hand and fingers waving in front of the eye in such a state, as shown in FIG. 1, the background remains in gray but the "JPO" part is sensed with red, cyan and gray being switched. Consequently, the person recognizes the "JPO" part as an afterimage overlapping with the gray background.

In the above example, when an all-gray dummy image is repeatedly displayed by switching the information image, the concealment image and the dummy image in turn at high speed, a ratio of the "JPO" part in gray is increased. Therefore, the "JPO" part is easily turned into like the latent image, and then the confidentiality of the "JPO" part can be increased.

When each of the letters "JPO" has a different color or has a striped pattern in a plurality of colors, the whole image cannot be easily grasped even if the "JPO" is partially recognized. Consequently, the confidentiality of the "JPO" part can be increased.

Further, when the information figure is displayed in a color different from the information background figure in the information image, the information image and the concealment image do not need to be subjected to the processing of light reduction if the image is displayed in the following manner. That is, the information figure can also be concealed when the information image and the concealment image are displayed with a certain amount of light. In the case of this method, the processing of light reduction is not required, thereby facilitating the processing of causing the display means 20 to display the information image. Consequently, the configuration of the apparatus for providing information 1 of the present invention can be simplified.

For example, the color of the background is changed in the following order: R (red), G (green), B (blue), R, G, B, while the color of the information figure is changed in the following order: G, B, R, G, B, R. Then, the information figure and the information background figure can be clearly distinguished from each other to be displayed at each timing. Moreover, when the display means 20 is normally viewed, the display means 20 can be viewed as if only a white image is displayed.

In this case, with respect to one image, the other two images function as the concealment image. That is, if an image having a background in color R and an information figure in color G is regarded as the information image, an image having a background in color G and an information figure in color B, and an image having a background in color B and an information figure in color R correspond to the concealment image. Further, if the image having the background in color G and the information figure in color B is regarded as the information image, the image having the background in color R and the information figure in color G, and the image having the background in color B and the information figure in color R correspond to the concealment image. In such a manner, a plurality of concealment images may be used with respect to one information image.

As shown in FIG. 8, a color of an information figure successively changes (patterns 1 to 3), and then a background thereof has an overlapping color at the time of overlapping all colors of the information figure (see pattern 5). Then, the information figure having a plurality of colors thereinside, for example, a rainbow-color image figure is formed depending on the timing of blocking light (see pattern 4), thereby increasing a pleasure of viewing the image displayed on the display means 20.

Further, phases of the information figure and the information background figure may be changed in the information image, while the both figures are displayed in the same color. In this case, phases of flashing of light sources are shifted, and then the image is displayed on the display means 20 so that the information figure is light (dark) with the information background figure dark (light). If that happens, an effect similar to the case of alternately changing colors of the information figure and the information background figure can be obtained even though a letter and the background have the same color.

(Example where Luminance is Used)

Description will be made on the case where the information figure and the information background figure in the information image differ from each other in luminance with reference to FIG. 9.

As shown in FIG. 9, a background of an information image is black (that is, low luminance) and a number "29" is white (high luminance) (pattern 2), on the contrary, a background of a concealment image is white and the number "29" is black (pattern 1). When such information image and concealment image are switched at high speed to be displayed on the display means 20, as to the "29" part, a person recognizes as if the "29" part is gray (middle luminance) and the background part is also gray (middle luminance). Therefore, the "29" part melts into the background to become like a latent image, causing the person viewing the display means 20 not to recognize the number "29" (pattern 5 in FIG. 10). When the person views the display means 20 in such a state with a hand and fingers waving in front of the eye as shown in FIG. 1, not only the "29" part but also the background part are sensed with white, black and gray being switched. The "29" part and the background complementarily appear. That is, when a part of "29" is sensed as white, the background close to the part is sensed as black (pattern 4 in FIG. 10). On the contrary, when a part of "29" is sensed as black, the background close to the part is sensed as white (pattern 3 in FIG. 10). Since a boundary between the part of the number "29" and the background is clearly sensed in any state, the person can recognize the whole of the number "29".

Further, in the case where the information figure and the information background figure in the information image differ from each other in luminance, information can be concealed even in a single-color screen of red, blue or green, or even white backlight for illumination can be used for concealing information. Moreover, information can be advantageously provided using the same array to observers having different sensory properties of color.

(Example of Billboard Lighting)

In the above example, the description has been made on the case where the light from the display means 20 directly enters the person's eye. However, a similar effect can be obtained even in the case where the light from the display means 20 indirectly enters the eye using a video projector or the like. For example, assume that an information image or the like is projected on a billboard from a projector during the daytime. If a person viewing the billboard waves a hand in front of an eye or the like, only a part on which the image is projected from the projector flickers, thereby allowing the person to recognize the information.

(Apparatus for Providing Information 1B in Another Embodiment)

The description has been made on the case of displaying an image on the display means in the above apparatus for providing information 1. However, as described above, a ceiling having a plurality of fluorescent lamps arranged, backlight of a liquid crystal display or the like can be used as display means. Hereinafter, an apparatus for providing information 1B with display means 40 will be described.

(Display Means 40)

Figure 11:
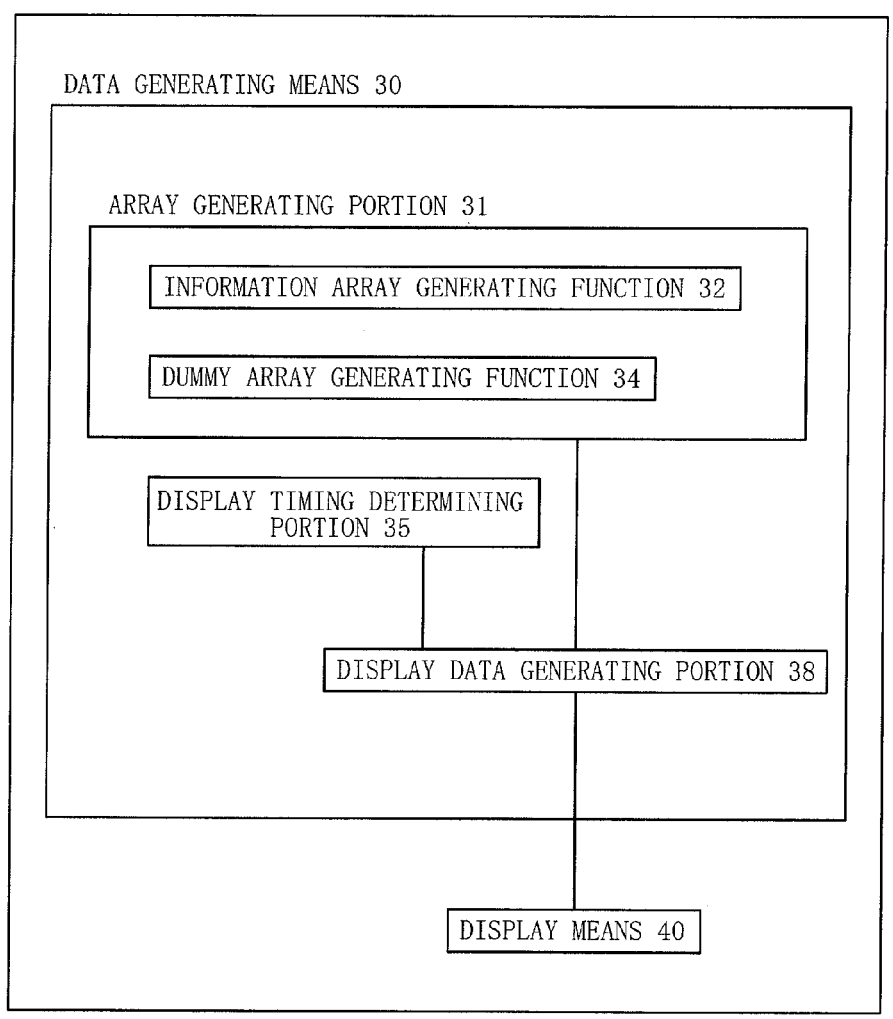
FIG. 11 is a schematic block diagram of an apparatus for providing information 1B of the present invention.

As shown in FIG. 11, the display means 40 in the apparatus for providing information 1B is ceiling light, backlight of a liquid crystal display or the like and is obtained by arranging a plurality of fluorescent lamps, LED light sources or the like. That is, a light source of the display means 40 is normally lit so as to allow light to successively enter a person's eye, and can flicker at high speed or can cause a phase or a color of light to be changed at high speed.

The light source of such display means 40 is not particularly limited, for example, an inverter fluorescent lamp, an LED lamp or the like can be used as the light source of the display means 40.

As an example, the display means 40 of the apparatus for providing information 1B includes a ceiling having a plurality of fluorescent lamps arranged, backlight of a liquid crystal display, a neon sign, illumination for irradiating a billboard or the like with light, but not particularly limited.

(Data Generating Means 30)

As shown in FIG. 11, data generating means 30 includes an array generating portion 31, a display timing determining portion 35 and a display data generating portion 38, similarly to the data generating means 10 of the apparatus for providing information 1. The array generating portion 31 includes an information array generating function 32.

34

(Information Array Generating Function 32)

The information array generating function 32 generates information array data for generating an information display array including information to be provided. The information array generating function 32 memorizes information concerning how the light sources of the display means 40 are arranged, and generates the information array data based on the information.

The information array data generated by the information array generating function 32 includes: data indicating a location of a light source to be turned on or off for causing the display means 40 to display the information display array; and data indicating an amount of light of each light source, a phase or a color of the light for causing the display means 40 to display the information. A concept of turning off in the above includes not only a state where the light source does not emit light at all, but also a state where the light emitted from the light source is reduced (that is, light reduction).

For example, if the information to be provided is the number "29" and light sources of the display means 40 are rod-like fluorescent lamps arranged so as to form a number "88", generated is the information array data instructing that some of the fluorescent lamps are to be turned on and the others are to be turned off, as shown in FIG. 13 (C). The information array generating function 32 also transmits generated timing information to the display data generating portion 38.

(Display Timing Determining Portion 35)

The display timing determining portion 35 determines timing at which the display means 40 is turned on using an array including the information to be provided, and then generates information concerning the timing (timing information). The display timing determining portion 35 also transmits the generated timing information to the display data generating portion 38.

The timing information includes information concerning how many times the information display array is displayed on the display means 40 for one second. In other words, the timing information includes information concerning in which cycle the information display array is displayed.

The cycle of displaying the information display array is not particularly limited. However, it is preferred that, when a person waves the light-blocking object in front of the eye, the person can sense the information display array based on the above principle by light entering the eye without the light-blocking object in front of the eye. In this case, the person can advantageously sense and recognize the information display array simply by waving the light-blocking object such as a hand without a special instrument.

(Display Data Generating Portion 38)

The display data generating portion 38 generates display data for controlling lighting of the display means 40 based on the information array data transmitted from the array generating portion 31 and the timing information transmitted from the display timing determining portion 35.

The display timing determining portion 35 also transmits the generated display data to the display means 40.

Further, the display timing determining portion 35 may directly control an operation (that is, lighting) of the display means 40 based on the generated display data.

The display data generating portion 38 memorizes information concerning how the light sources of the display means 40 are arranged. The display data generating portion 38 generates the display data indicating which light source is to be turned on or off at which timing based on the information array data and the timing information. In the case of generating the information display array by changing a phase or a color of the light emitted from the light source, the display data indicating which light source is to be turned on with which phase or color at which timing is generated.

(Effect of Apparatus for Providing Information 1B of the Present Invention)

Now, description will be made on an effect obtained when the method for providing information of the present invention is performed with the apparatus for providing information 1B of the present invention.

Hereinafter, description will be made on the case where the light sources of the display means 40 are rod-like fluorescent lamps arranged so as to form the number "88" and information to be provided is the number "29".

The information to be provided, that is, the information of the number "29" is first supplied to the data generating means 30 in the apparatus for providing information 1B of the present invention.

Then, as shown in FIG. 12, the information array generating function 32 of the data generating means 30 generates information array data for displaying an information display array including the information of the number "29" on the display means 40. That is, in order to form the number "29" of the information, which light source is to be turned on or off among the plurality of light sources of the display means 40 is determined, thereby generating the information array data.

On the other hand, the display timing determining portion 35 of the data generating means 30 determines timing at which the display means 40 is turned on so as to display the information display array, thereby generating the timing information. This cycle is adjusted so that a person cannot visually recognize the information display array, that is, the number "29" when the display means 20 displays the information display array.

When the information array data and the timing information are generated, the information array generating function 32 supplies the information array data to the display data generating portion 18 and the display timing determining portion 15 supplies the timing information to the display data generating portion 18. Consequently, the display data is generated.

More specifically, display timing determining portion 15 generates data concerning which light source is to be turned on or off at which timing among the respective light sources of the display means 40 for displaying the information display array. This data is transmitted to the display means 40 as the display data.

When the display data is transmitted to the display means 40, the display means 40 is turned on based on the display data. More specifically, the display means 40 is turned on so that a state where all the light sources of the display means 40 are lit (concealment state) and a state where the light sources are lit using the information display array (information display state) are switched at high speed. Then, all of the light sources of the display means 40 are turned on/off at high speed so that the concealment state and the information display state are switched at high speed for display. Since the light sources are turned on/off at extremely high speed, and further a period during which the light sources are lit according to the information array is extremely short, the person recognizes as if the respective fluorescent lamps of the display means 40 are successively lit.

Here, assume that the person views the display means 40 to wave the light-blocking object such as a hand having space between fingers in front of the person's eye, as shown in FIG. 13(A). In such a case, the person can recognize the whole image of the letter array "29" of the information array based on fragmentary afterimages of the number "29" of the information array on the display means 40.

As described above, the apparatus for providing information 1B of the present invention can provide information without using special display means. This is because common lighting equipment can be used as the display means 40 as long as the equipment can be turned on/off at high speed or can change a phase or color of light at high speed as described above.

In the above example, as light sources, the rod-like fluorescent lamps arranged so as to form the number "88" are illustrated. Obviously, even illumination in which a plurality of point light sources such as LED light sources are arranged can function similarly.

In the above example, the description has been made on the case where all of the light sources in the display means 40 are turned on/off at high speed at the time of switching the concealment state and the information display state. However, the light sources that are lit in the both concealment state and information display state may be successively lit, while only the light sources whose turning on/off states change in the both states may be turned on/off at high speed (for example, 120 Hz or more). In this case, the number of light sources that are turned on/off can be reduced, thereby suppressing a flicker.

(Dummy Lighting)

As described above, the description has been made on the case where the concealment state and the information display state are switched at high speed in the apparatus for providing information 1B. However, dummy lighting may be performed in order to suppress a flicker along with switching the states.

The dummy lighting means that all of the light sources are successively lit for a certain period of time. Since the light sources successively emit light during the dummy lighting period, the flicker do not occur at all during the period.

Therefore, if the dummy lighting is performed with the concealment state and the information display state being switched at high speed for lighting, the flicker of the display means 40 can be reduced.

For example, in the case where the display means 40 in the apparatus for providing information 1B is used as illumination or the like for a neon sign or a transparent poster such as a film, the dummy lighting allows the neon sign and the poster to be stably lit during the period. Then, letters on the neon sign, printing on the poster or the like can be easily viewed.

Such data for dummy lighting may be generated at the display data generating portion 38, while the array generating portion 31 may include a dummy array generating function 34 for generating the data for dummy lighting.

(Example of Backlight of Liquid Crystal Display)

In a liquid crystal display, an image is normally displayed by operating a liquid crystal cell with backlight always being lit. That is, the backlight only functions as lighting equipment. If backlight having a plurality of point light sources arranged is employed, the backlight has substantially the same configuration as the LED display.

Then, the backlight of the liquid crystal display operates similarly to the display means 40 of the apparatus for providing information 1B. In that case, information (the letters "JPO" in FIG. 14) can be concealed in light from the backlight emitted from the liquid crystal display, while a normal image is displayed on the liquid crystal display (see FIG. 14).

Accordingly, when a person views the liquid crystal display to wave a hand having space between fingers in front of the person's eye even with a normal image displayed on the liquid crystal display, the person can recognize the information included in the light from the backlight as fragmentary afterimages.

In the case of using the backlight of the liquid crystal display, a frequency at which the concealment state (that is, all of the light are on) and the information display state are switched needs to be higher than an addressing frequency of the liquid crystal cell.

(Example of Providing Information According to Method for Providing Information of the Present Invention)

The following case can be assumed as an example of providing information according to the method for providing information of the present invention.

For example, with the method for providing information of the present invention, a coupon code can be embedded in an advertisement using digital signage. A viewing time of a viewer with respect to the advertisement can be increased even though many electronic advertisements exist. That is, only the viewer who pays attention to the advertisement can obtain the coupon code, and therefore, the viewing time of the viewer with respect to the advertisement can be increased in order to acquire the coupon code.

Alternatively, in the case of providing a quiz on television or in a train, an answer of the quiz can be provided for only a person who wants the answer according to the method for providing information of the present invention. The time when an answer of the quiz is required depends on people. Therefore, with the method for providing information of the present invention, people can obtain the answer whenever they want. Then, attention can be paid from a person, for example, who is not interested in quizzes or the like because answers are often shown before the person finds an answer, on the contrary, a person who is not interested in quizzes or the like because it takes a long time to show answers. For example, in the LED display, such configuration can be achieved using the apparatus for providing information 1 of the present invention. In an LCD television or the like, such configuration can be achieved by backlight modulation using the apparatus for providing information 1B of the present invention.

Further, information provided by a television opaque projector or the like that is currently employed in a television technology can also be provided according to a method similar to the above method for providing quizzes. Then, when many people view an image on the LED display or the LCD television, people who do not want to view such information is not provided with the information, while people who want the information can obtain the information according to their mind.

Furthermore, in a baseball ground, an outcome of a baseball game in another baseball ground can be displayed on a large screen according to a method similar to the above method for providing quizzes.

Then, when another information in an advertisement on a vending machine or on a signboard at a street corner can be viewed by waving a hand, an induction effect to the advertisement or the vending machine can be expected. In particular, if an outcome of a game of a team sponsored by a manufacturer or the like that runs an advertisement is displayed on the advertisement, the induction effect to the advertisement or the vending machine can be increased.

At a hotel or the like, a room number can be concealed in illumination of a floor or a guest room using the apparatus for providing information 1B of the present invention. Further, an arrow or the like indicating an entrance, an exit or the like can be concealed in illumination of a floor or the like in public facilities using the apparatus for providing information 1B of the present invention.

(Concealment by Mixing Images Displayed at High Speed)

An information image, a concealment image and a dummy image are divided into a plurality of rows to combine the divided information (image) at respective rows of the respective images, and thereby the plurality of images may be formed. For example, an image A includes 3n rows of the information image, (3n+1) rows of the concealment image and (3n+2) rows of the dummy image. On the other hand, an image B includes (3n+1) rows of the information image, (3n+2) rows of the concealment image and 3n rows of the dummy image.

Further, an image C includes (3n+2) rows of the information image, 3n rows of the concealment image and (3n+1) rows of the dummy image. Then, each of the images A, B and C has a disordered pattern of light and darkness, thereby allowing the information images not to be visually recognized as they are. However, if the images A, B and C are switched and displayed on the screen of the display means to observe the screen through a partially blocking-object, an outline of the letter part included in the information image or the like can be visually recognized.

Note that "row" into which the information image or the like is divided may be a "row" divided in a horizontal direction or a "column" in a vertical direction, not particularly limited.

A method for dividing the information image or the like into rows is not particularly limited in each image. In the all images, a width of each row is not necessarily the same and may be random. When an image is formed by combining the rows obtained by dividing each image, the each row is not necessarily arranged regularly and may be arranged randomly.

Further, division of the information image or the like is not necessarily performed in the form of row. The information image or the like may be divided into an appropriate shape (for example, a quadrilateral) to be fragmentary.

EXAMPLE

When an image having information embedded therein was displayed on display means according to the method for providing information of the present invention, it was confirmed that a person could visually recognize the embedded information.

In an experiment, two images having information embedded therein were alternately switched to be displayed on an LED panel having a plurality of LED light sources. In such a state, it was confirmed that the information could be visually recognized by observing the LED panel with a hand waving. Further, it was confirmed that, in the case of taking a displayed screen on a normal video camera (60 frames per second), the image was taken only as a white screen. However, in the case of taking the displayed screen with a hand waving in front of the video camera, the outline of the embedded letters reappeared.

As for the displayed image, an information image (information figure: cyan, background figure: light gray) and a concealment image (information concealment figure: red, concealment background figure: light gray) were formed by embedding letters having two colors in the complementary color relationship (cyan and red) in a background image (light gray).

An LED display system at high speed (HS Cyber Vision) developed by AVIX Co. Ltd et al. was used for displaying the image. In this system, an LED panel on which the images can be switched and displayed at high speed of 480 frames per second (480 fps) is employed.

In the experiment, the information image and the concealment image were alternately displayed at 240 frames per second using this system.

First, when the information image and the concealment image were switched to be displayed at 240 frames per second, the person could recognize the letters with the hand waving in front of the eye.

Figure 15:
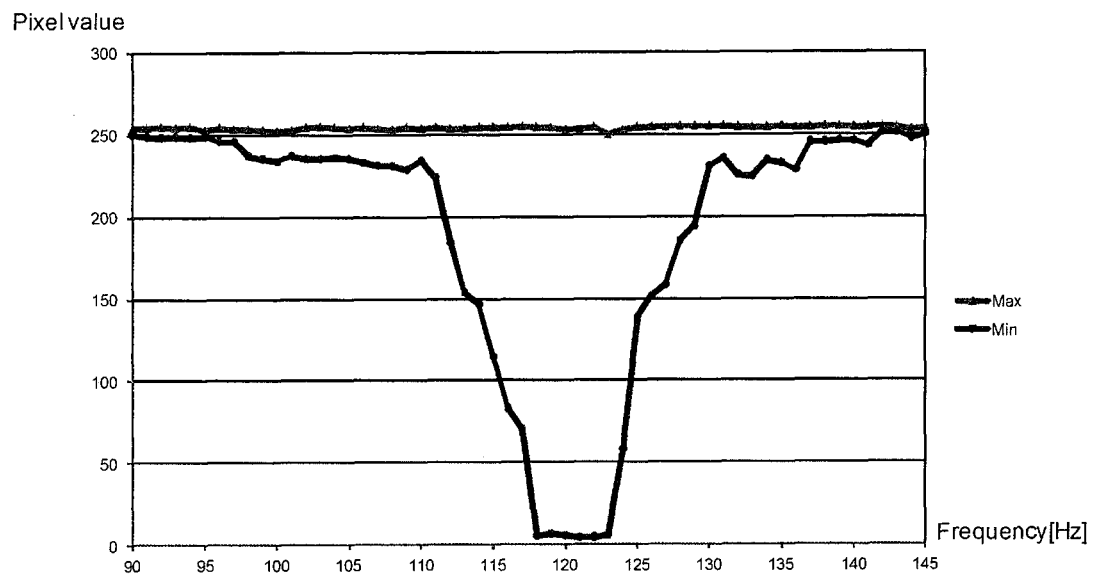
FIG. 15 is a graph showing experimental results in Example.
Figure 16:
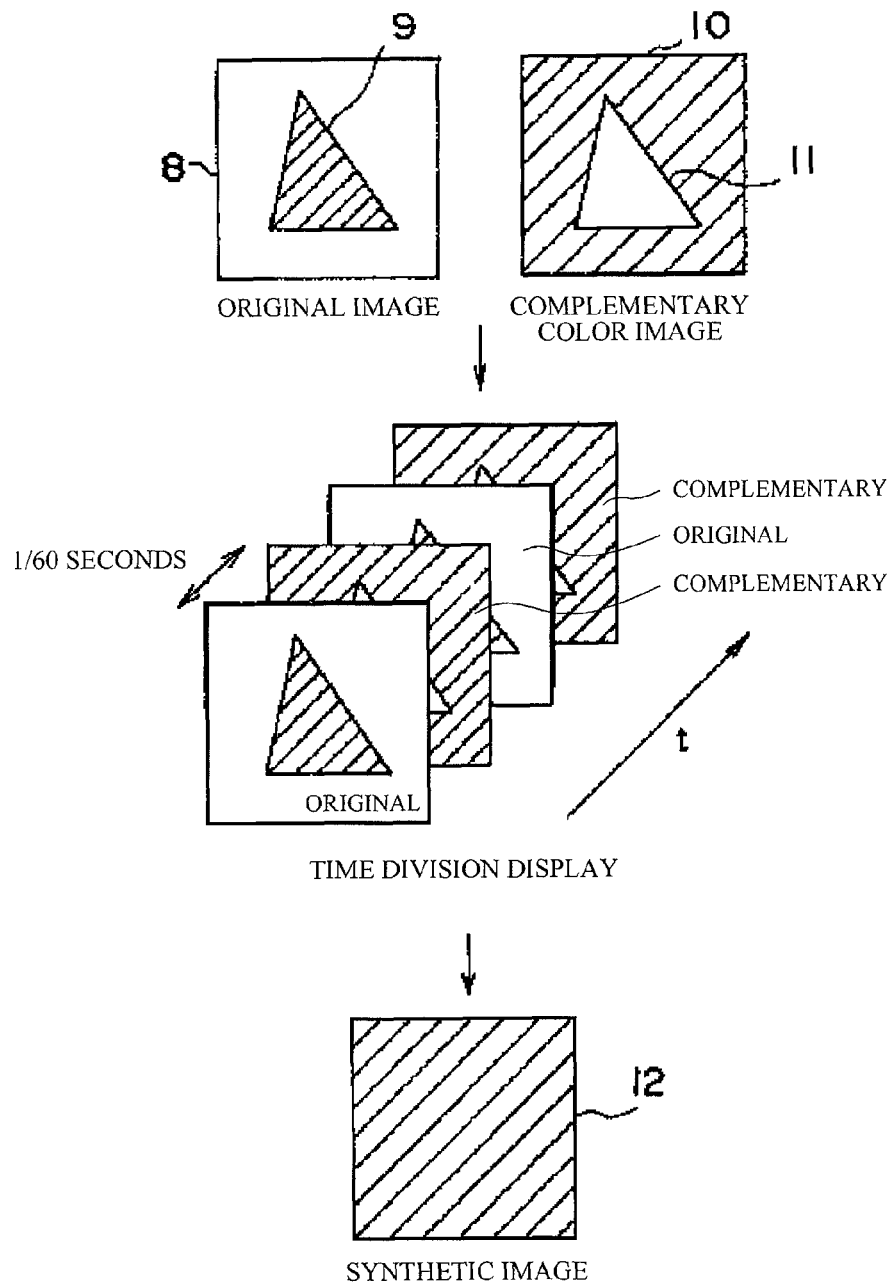
FIG. 16 shows schematic diagrams of a conventional technique.

Next, the information image and the concealment image were alternately displayed in the switching cycle described above. Then, a contrast of the decoded image was measured when a cycle of blocking light was changed. FIG. 15 verifies that a contrast necessary for a person to recognize the information of the letters embedded in the both images reappears in the decoded image between 98 to 140 Hz.

FIG. 15 further verifies that the contrast in the decoded image increases between 98 to 135 Hz, and the contrast further increases between 98 to 110 Hz or 130 to 135 Hz, as well as the substantially similar contrast is maintained between these frequencies.

FIG. 15 furthermore verifies that the contrast abruptly increases between 110 to 130 Hz as the frequency comes close to 120 Hz, in particular, the contrast is extremely high between 118 to 123 Hz.

According to the above results, the information of the letters embedded in the image could be recognized when the switching cycle was asynchronous to the cycle of blocking light. Moreover, when the cycle of blocking light was appropriately set, the information could be recognized at an extremely high information recognition rate.

INDUSTRIAL APPLICABILITY

The method for providing information of the present invention can be used as a method for secretly providing information to digital signage using an LED display, a liquid crystal display or the like, or a method for secretly providing information using illumination or the like at facilities such as public facilities or hotels.

REFERENCE SIGNS LIST 1 apparatus for providing information
1B apparatus for providing information
10 data generating means
11 array generating portion
12 information array generating function
13 concealment array generating function
14 dummy array generating function
15 display timing determining portion
18 display data generating portion
20 display means
30 data generating means
31 array generating portion
32 information array generating function
34 dummy array generating function
35 display timing determining portion
38 display data generating portion
40 display means A information image
A1 information figure
B concealment image
B1 information concealment figure

The invention claimed is:

1. A method for providing information using an apparatus for providing information that displays information using a light array: comprising
switching and displaying an information array and a concealment array in a cycle in which a person cannot sense an information display array of the information array using the apparatus for providing information, the information array including the information display array concerning information to be provided, the concealment array being generated so that the information display array becomes invisible when the concealment array overlaps with the information array; and
intermittently blocking a visual field of the person so as to become asynchronous to a switching cycle in which the information array and the concealment array are switched and displayed such that a person can recognize the information array or the concealment array.

2. The method for providing information according to claim 1, further comprising:
switching and displaying the plurality of information arrays and the plurality of concealment arrays corresponding to the respective information arrays using the apparatus for providing information.

3. The method for providing information according to claim 1, further comprising:
forming a complementary color relationship between a color of light of the information display array in the information array, and a color of light of an information concealment array overlapping with the information display array when the information array overlaps with the concealment array.

4. The method for providing information according to claim 1, wherein, in the information array, a difference in luminance between the information display array and a background array other than the information display array increases, and
in the concealment array, luminance in the information concealment array is similar to that of a background array in the information array, and
luminance in a concealment background array other than the information concealment array is similar to that of the information display array.

5. The method for providing information according to claim 1, further comprising:
displaying a dummy array between timing of displaying the information array and timing of displaying the concealment array, wherein the dummy array has an array different from the information concealment array and the information display array at a location where the information display array in the information array and the information concealment array in the concealment array are displayed when the dummy array overlaps with the information array and the concealment array.

6. The method for providing information according to claim 1, wherein the apparatus for providing information includes a display screen obtained by arranging a plurality of LED light sources, and the information array and the concealment array are switched at a display speed of 240 frames per second or more to be displayed on the display screen.

7. The method for providing information according to claim 1, further comprising:

adjusting the switching cycle of the information array and the concealment array to a speed at which the person can sense the information display array in the information array by light entering an eye without a light-blocking object in front of the eye when the person waves the light-blocking object in front of the eye.

8. An apparatus for providing information that displays concealed information using a light array, the apparatus comprising:
a display for displaying information using a light array; and
a data generator including an array generating portion that generates information array data and concealment array data, the information array data being for displaying, on the display, an information array including an information display array concerning information to be provided, the concealment array data being for displaying, on the display, a concealment array generated so that the information display array becomes invisible at the time of the concealment array overlapping with the information array,
wherein the data generator includes a display timing determining portion generating timing information concerning timing at which the display displays each array,
wherein the display timing determining portion generates timing information based on the information array data and the concealment array data so that the information array and the concealment array are switched in a switching cycle of 120 Hz or more such that a person cannot sense the information display array in the information array, and
wherein the person can recognize the concealed information without an apparatus for exclusive use of making the concealed information visible.

9. The apparatus for providing information according to claim 8,
wherein the array generating portion includes a function for generating the plurality of information array data, and the plurality of concealment array data for displaying, on the display, concealment arrays corresponding to information arrays displayed based on the respective information array data, and the display timing determining portion generates the timing information concerning timing at which the plurality of information array data and the plurality of concealment array data are displayed.

10. The apparatus for providing information according to claim 8,
wherein the array generating portion generates the information array data and the concealment array data so that a color of light of the information display array in the information array is in a complementary color relationship with a color of light of an information concealment array overlapping with the information display array when the information array overlaps with the concealment array.

11. The apparatus for providing information according to claim 8,
wherein the array generating portion generates the information array data so that a difference in luminance between the information display array and a background array other than the information display array in the information array increases, and the array generating portion generates the concealment array data so that luminance in the information concealment array is similar to that of a background array in the information array, and luminance in a concealment background array other than the information concealment array in the concealment array is similar to that of the information display array.

12. The apparatus for providing information according to claim 8,
wherein the data generator includes a function for generating dummy array data for displaying a dummy array on the display, the dummy array has an array different from the information concealment array and the information display array at a location where the information display array in the information array and the information concealment array in the concealment array are displayed when the dummy array overlaps with the information array and the concealment array, and the display timing determining portion generates the timing information so that the dummy array is displayed between timing of displaying the information array and timing of displaying the concealment array.

13. The apparatus for providing information according to claim 8,
wherein the display includes a display screen obtained by arranging a plurality of LED light sources, and the information array and the concealment array can be switched at a display speed of 240 frames per second or more to be displayed on the display screen.

* * * * *